US010826423B2

(12) United States Patent
Kawai et al.

(10) Patent No.: US 10,826,423 B2
(45) Date of Patent: Nov. 3, 2020

(54) MOTOR DRIVING APPARATUS AND MOTOR DRIVING METHOD

(71) Applicant: RENESAS ELECTRONICS CORPORATION, Tokyo (JP)

(72) Inventors: Hiroaki Kawai, Tokyo (JP); Shunsuke Nakano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/375,606

(22) Filed: Apr. 4, 2019

(65) Prior Publication Data
US 2019/0326843 A1 Oct. 24, 2019

(30) Foreign Application Priority Data

Apr. 23, 2018 (JP) ................................ 2018-082082

(51) Int. Cl.
*H02P 25/22* (2006.01)
*H02P 27/06* (2006.01)
*B62D 5/04* (2006.01)
*H02P 23/00* (2016.01)

(52) U.S. Cl.
CPC .............. *H02P 25/22* (2013.01); *B62D 5/046* (2013.01); *H02P 23/0004* (2013.01); *H02P 27/06* (2013.01)

(58) Field of Classification Search
CPC .... B62D 5/04; B62D 5/00; B62D 6/00; H02P 1/00; H02P 1/04; H02P 1/46; H02P 3/00; H02P 3/18; H02P 3/12; H02P 23/00; H02P 27/00; H02P 27/04; H02P 27/06; H02P 6/00; H02P 6/04; H02P 6/14; H02P 21/00; H02P 1/465; H02K 19/12; B65H 2403/923
USPC ..... 318/400.01, 400.02, 700, 701, 721, 727, 318/779, 799, 800, 801, 430, 432, 705
See application file for complete search history.

(56) References Cited

U.S. PATENT DOCUMENTS

| 6,693,405 | B2 * | 2/2004 | Blanke ................... | B62D 5/003 180/446 |
| 10,205,416 | B2 * | 2/2019 | Furukawa ................ | H02P 6/16 |
| 10,322,748 | B2 * | 6/2019 | Yanagi ................... | B60W 50/04 |

(Continued)

FOREIGN PATENT DOCUMENTS

WO       2016/135840 A1    9/2016

*Primary Examiner* — Antony M Paul
(74) *Attorney, Agent, or Firm* — McDermott Will & Emery LLP

(57) ABSTRACT

A motor driving apparatus includes a first driving control circuit (an MCU, a driving circuit, an input circuit, a power management IC) and a second driving control circuit (an MCU, a driving circuit, an input circuit, a power management IC). The first driving control circuit and the second driving control circuit are configured to drive a corresponding winding group of winding groups of a motor, and have a master mode for outputting a synchronous trigger signal in synchronization with driving of the corresponding winding group and a slave mode for synchronizing the driving of the corresponding winding group with an input synchronous trigger signal. When an error has occurred in an operation of the first driving control circuit in the master mode, the second driving control circuit switches an operation mode of the second driving control circuit from the slave mode to the master mode.

16 Claims, 20 Drawing Sheets

(56) References Cited

U.S. PATENT DOCUMENTS

2017/0237377 A1* 8/2017 Furukawa ............... H02P 29/00
318/564

* cited by examiner

MOTOR DRIVING APPARATUS AND MOTOR DRIVING METHOD

CROSS-REFERENCE TO RELATED APPLICATIONS

The disclosure of Japanese Patent Application No. 2018-082082 filed on Apr. 23, 2018 including the specification, drawings and abstract is incorporated herein by reference in its entirety.

BACKGROUND

The present disclosure relates to a motor driving apparatus and a motor driving method, and is applicable preferably to, for example, a device which drives a brushless motor.

In development of an autonomous driving function for automobiles, it is demanded that a fail operation is implemented in various control systems regarding operations of the automobiles, such as accelerating, steering, and braking. That is, even when a failure occurs in these control systems, it is required to continue safe operations.

There is proposed a dual system control system, in terms of, for example, electric power steering. International Publication No. 2016/135840 discloses an electric driving device having a plurality of micro processors and an electric power steering device including the electric driving device. The electric driving device includes an electric motor and a control unit driving the electric motor. The electric motor has a single rotor and a stator including independent two sets of stator winding groups. The control unit includes two micro processing units (MPU) which can communicate with each other.

According to International Publication No. 2016/135840, a pull-up resistor is externally coupled to the CPU of one of the two MPU, while a pull-down resistor is externally coupled to the CPU of the other one, and the master CPU and the slave CPU are uniquely set. At the activation of the system, the master CPU outputs a synchronous trigger signal, and the slave CPU waits to receive the synchronous trigger signal. This enables to synchronize inputting of sensor information, calculating of a control amount, and motor-controlling, between the master CPU and the chip CPU.

SUMMARY

According to a configuration disclosed in International Publication No. 2016/135840, when some kind of failure has occurred in the system of the master CPU, the master CPU may not possibly output a synchronous trigger signal. Because the slave CPU waits to receive the synchronous trigger signal from the master CPU, the electric motor may not be driven, even when the system of the slave CPU is normally operated. Thus, in the system disclosed in International Publication No. 2016/135840, when some kind of failure has occurred in the system of the master CPU, the electric motor cannot continuously be operated as a redundant system.

Any other objects and new features will be apparent from the descriptions of this specification and the accompanying drawings.

According to an embodiment, a motor driving apparatus drives a motor having a plurality of independent winding groups, and includes a first driving control circuit and a second driving control circuit which have a master mode and a slave mode. When an error has occurred in an operation of the first driving control circuit in the master mode, the second driving control circuit switches an operation mode of the second driving control circuit from the slave mode to the master mode.

According to an embodiment, a motor driving method is provided for driving a motor having a plurality of independent winding groups by a first driving control circuit and a second driving control circuit. The motor driving method includes a step of switching an operation mode of the second driving control circuit from the slave mode to the master mode, when an error has occurred in an operation of the first driving control circuit in the master mode.

According to an embodiment, it is possible to continuously drive the motor having a plurality of independent winding groups.

BRIED DESCRIPTION OF THE DRAWINGS

DETAILED DESCRIPTION

Figure 1:
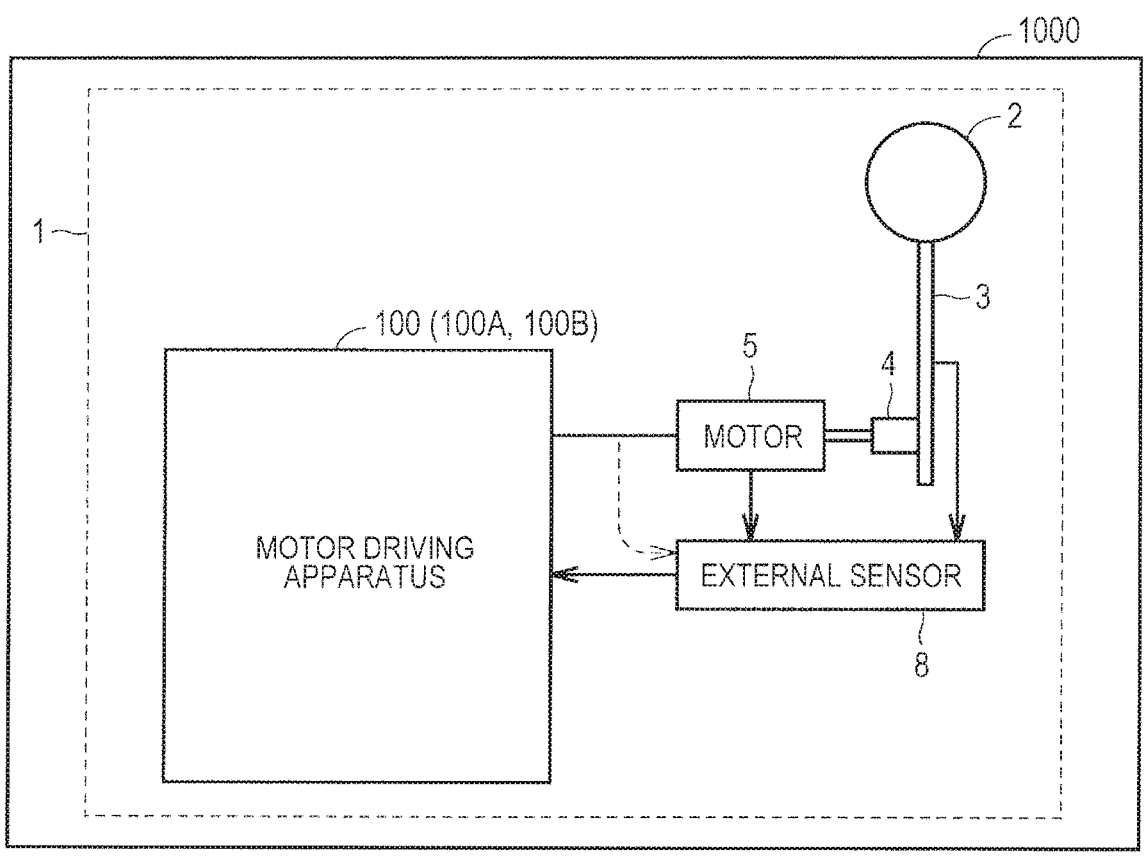
FIG. 1 is a schematic diagram illustrating one application example of a control system including a motor driving apparatus according to this embodiment.

Preferred embodiments will now specifically be described by reference to the accompanying drawings. The same constituent elements will be identified by the same reference numerals, and thus will not be described over and over.

FIG. 1 is a schematic diagram illustrating one application example of a control system including a motor driving apparatus according to this embodiment. As illustrated in FIG. 1, a vehicle control system 1000 includes an electric power steering system 1. The electric power steering system 1 includes a steering wheel 2, a steering shaft 3, a speed reduction gear 4, a motor 5, an external sensor 8, and a motor driving apparatus 100.

In FIG. 1, the motor driving apparatus according to any of the preferred embodiments is denoted by a reference numeral [100 (100A, 100B)]. The motor driving apparatus 100 is a motor driving apparatus according to the first embodiment. The motor driving apparatus 100A is a motor driving apparatus according to the second embodiment, and the motor driving apparatus 100B is a motor driving apparatus according to the third embodiment. Each of the motor driving apparatuses 100, 100A, and 100B is realized in the form of, for example, an ECU (Electronic Control Unit).

Descriptions will be made to the electric power steering system 1 including the motor driving apparatus 100, as an example. The steering wheel 2 is fixed to one end of the steering shaft 3. A steering force generated by the driver operating the steering wheel 2 is transmitted to the steering shaft 3. The speed reduction gear 4 is coupled to the steering shaft 3, and rotation of the motor 5 is transmitted to the steering shaft 3.

The external sensor 8 detects operation of the electric power steering system 1. The external sensor 8 may include, for example, a rotational speed sensor detecting the rotational speed of the motor 5, a torque sensor detecting the steering torque, and a steering angle sensor detecting a steering angle. Information of the external sensor 8 is sent to the motor driving apparatus 100.

The motor driving apparatus 100 calculates a control amount for driving the motor 5, based on the information from the external sensor 8. The motor driving apparatus 100 controls a current for driving the motor 5, in accordance with the control amount. Descriptions will hereinafter specifically be made to the following embodiments.

First Embodiment

Figure 2:
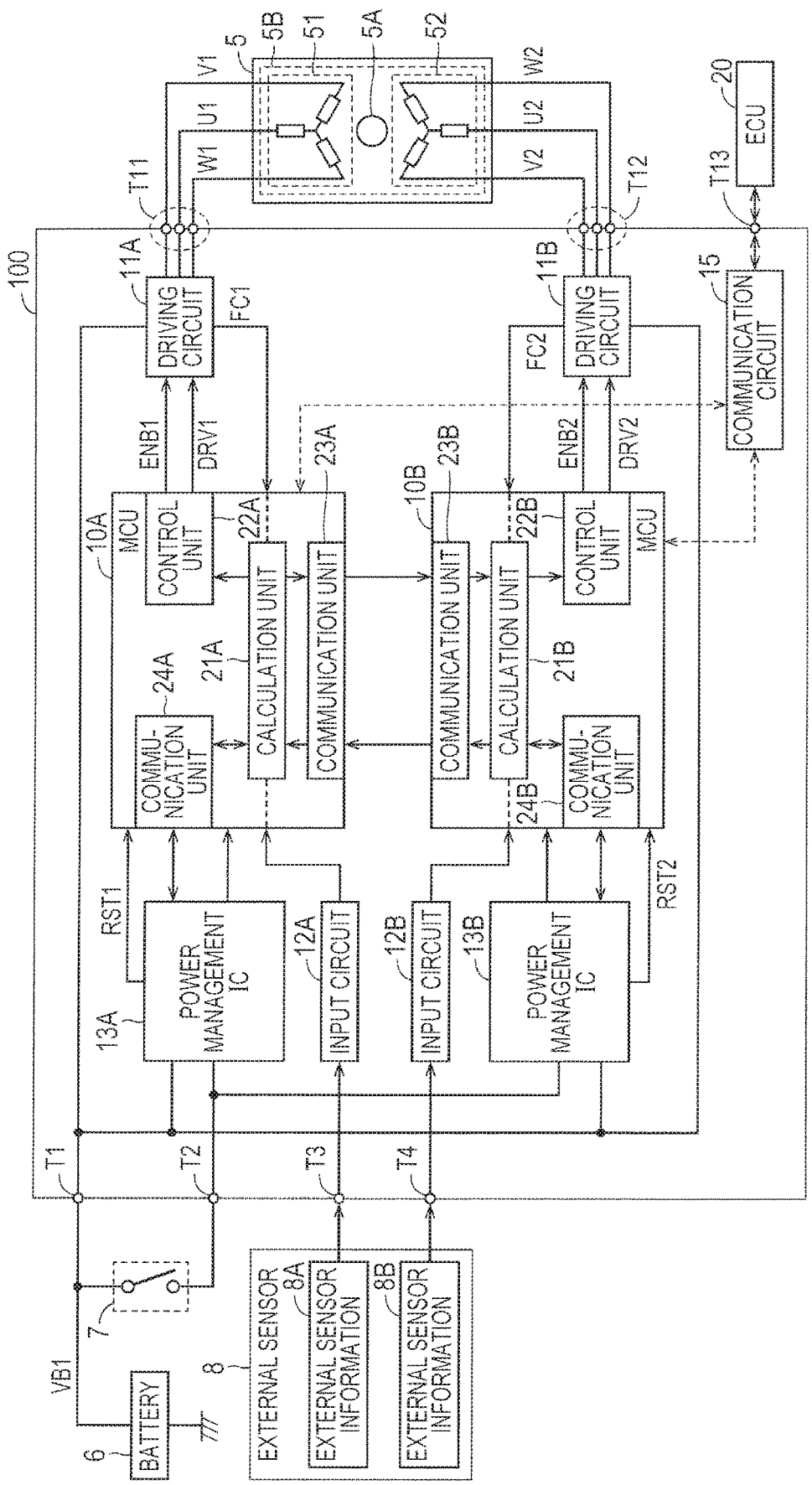
FIG. 2 is a block diagram illustrating an approximate configuration of the motor driving apparatus according to a first embodiment.

FIG. 2 is a block diagram illustrating an approximate configuration of the motor driving apparatus 100 according to the first embodiment. As illustrated in FIG. 2, the motor 5 includes a rotor 5A and a stator 5B. The stator 5B includes a plurality of independent winding groups. In one example, the motor 5 is a six-phase brushless motor, and the stator 5B includes a first winding group 51 and a second winding group 52. The first winding group 51 and the second winding group 52 are independent from each other. Each of the winding groups includes three phase windings corresponding respectively to three phases (U-phase, V-phase, and W-phase).

A battery 6 is a direct current power source, and is coupled to a terminal T1 of the motor driving apparatus 100. A switch 7 is coupled between the battery 6 and a terminal T2 of the motor driving apparatus 100. For example, in the above-described electric power steering system 1, the battery 6 is a vehicle-mounted battery, and the switch 7 is an ignition switch for a vehicle.

The external sensor 8 detects an operation of the electric power steering system 1 (illustrated in FIG. 1), as described above. The external sensor 8 has a duplicate configuration, and outputs duplicate sensor information. External sensor information 8A is first sensor information of the duplicate sensor information, and external sensor information 8B is second sensor information of the duplicate sensor information. For example, all of the rotational speed sensor, the torque sensor, and the steering angle sensor are duplicated. Thus, even when a failure has occurred in one of the duplicate sensors (two sensors of the same type), the other normal sensor can continuously perform a detection operation. The above-described various sensors may simply be redundant, and the number of same kind of sensors may be greater than two.

Each of the external sensor information 8A and the external sensor information 8B includes a plurality of sensor information items output from a plurality of sensors included in the external sensor 8. Thus, the motor driving apparatus 100 includes a plurality of terminals for respectively receiving the plurality of sensor information items. To avoid the complicated form of illustration, FIG. 2 comprehensively illustrates a terminal T3 receiving the external sensor information 8A and a terminal T4 receiving the external sensor information 8B.

The motor driving apparatus 100 has duplicate driving control systems. The "driving control system" is a driving control circuit including a driving circuit for driving the winding groups of the motor 5 and a control circuit for controlling the driving circuit. The driving control system will hereinafter be referred to as a "system".

The first system includes an MCU (Micro Control Unit) 10A, a driving circuit 11A, an input circuit 12A, and a power management IC (Integrated Circuit) 13A. The second system includes an MCU 10B, a driving circuit 11B, an input circuit 12B, and a power management IC 13B. Though not illustrated, each circuit inside the motor driving apparatus 100 and its functional block have a terminal for input/output.

Each of the driving circuits 11A and 11B is a three-phase inverter circuit. The driving circuits 11A and 11B are coupled to the terminal T1, and a DC voltage VB1 from the battery 6 is converted into AC voltages of three phases. Specifically, the driving circuit 11A supplies a driving current to the first winding group 51 of the motor 5 through a terminal group T11. The driving circuit 11B supplies a driving current to the second winding group 52 of the motor 5 through a terminal group T12.

The power management ICs 13A and 13B are coupled to the terminal T1, and coupled also to the terminal T2. When the switch 7 is OFF, the current voltage VG1 is supplied from the battery 6 to the terminal T1, and also the power management ICs 13A and 13B are in a standby state. If the switch 7 is turned on, the DC voltage VB1 is supplied from the battery 6 to the terminal T1 and the terminal T2, and the power management ICs 13A and 13B supply a power source voltage to each of the MCUs 10A and 10B. The power management ICs 13A and 13B are a first power supply control circuit and a second power supply control circuit.

The input circuit 12A is coupled to the terminal T3, and receives the external sensor information 8A through the terminal T3. The input circuit 12B is coupled to the terminal T4, and receives the external sensor information 8B through the terminal T4.

The input terminals 12A and 12B are configured to receives various sensor information. When the signal from the sensor is an analog signal, each of the input circuits 12A and 12B may include a discrete component for receiving the analog signal. Transmission of the analog signal may be performed by using, for example, SENT (Single Edge Nibble Transmission) communication. When sensor information is transmitted through a CAN (Controller Area Network), each of the input circuits 12A and 12B includes a CAN transceiver IC for receiving the information.

FIG. 2 illustrates the input circuits 12A and 12B independently from the MCU 10A and MCU 10B. At least a part of the input circuit 12A may be integrated with the MCU 10A. Similarly, at least a part of the input circuit 12B may be integrated with the MCU 10B.

The MCU 10A and the MCU 10B are control circuits that are realized by a semiconductor integrated circuit. The MCU 10A and the MCU 10B are respectively a first MCU and a second MCU.

The MCU 10A and the MCU 10B respectively control the driving circuits 11A and 11B to control the motor 5. Specifically, the MCU 10A controls the driving circuit 11A, based on the external sensor information input from the input circuit 12A. The MCU 10B controls the driving circuit 11B, based on the external sensor information 8B input from the input circuit 12B.

The MCU 10A and the MCU 10B have the same configuration. The MCU 10A includes a calculation unit 21A, a control unit 22A, a communication unit 23A, and a communication unit 24A. The MCU 10B includes a calculation unit 21B, a control unit 22B, a communication unit 23B, and a communication unit 24B.

The calculation unit 21A calculates a control amount for controlling the driving circuit 11A, based on the external sensor information 8A. The control unit 22A generates a control signal DRV1 for controlling the driving circuit 11A based on the control amount, and outputs the control signal DRV1 to the driving circuit 11A. The control system by the calculation unit 21A and the control unit 22A may be realized by using PWM (Pulse Width Modulation) control.

In order for the calculation unit 21A to calculate the control amount, the driving circuit 11A supplies a feedback current FC1 to the MCU 10A. In consideration of both the positive rotation and the reverse rotation of the motor 5 as rotational directions, the control unit 22A needs two signal lines to control each phase. Thus, in order for the control unit 22A to control three phases, six signal lines for coupling the control unit 22A and the driving circuit 11A are necessary, and six signals transmitted from the control unit 22A to the driving circuit 11A through the six signal lines are necessary. FIG. 2 comprehensively illustrates the six signals transmitted from the control unit 22A to the driving circuit 11A, as the control signals DRV1.

The control unit 22A outputs an enable signal ENB1 for enabling or disabling the operation of the driving circuit 11A to the driving circuit 11A, in addition to the control signal DRV1. The enable signal ENB1 is activated until a control start time of the motor 5. Activation of the enable signal ENB1 results in permitting output from the driving circuit 11A. When the driving circuit 11A cannot normally be operated, the control unit 22A inactivates the enable signal ENB1. This results in shutdown of the driving circuit 11A. For example, the enable signal ENB1 is a signal for controlling a power source relay (not illustrated) for switching whether to couple between the driving circuit 11A and the power source (battery 6).

The communication unit 23A is an interface circuit for communication between the MCU 10A and the MCU 10B. Communication between the MUC 10A and the MCU 10B can be performed using serial communication, for example, an SPI (Serial Peripheral Interface). This results in regularly sharing information regarding the MCUs between the MCU 10A and the MCU 10B. When a failure has occurred in one system, the MCU of the system detects the failure, and informs the other system of the failure (error).

The communication unit 24A is an interface circuit for communication between the MCU 10A and the power management IC 13A. The MCU 10A can write data to the power management IC 13A through the communication unit 24A, and can read data from the power management IC 13A. Using data, the MCU 10A detects the status of the power management IC 13A, and also sets the function of the power management IC 13A. One function of the power management IC 13A is, for example, a watchdog timer function. The power management IC 13A monitors the status of the MCU 10A, using the watchdog timer function. When an error (for example, runaway of a program) has occurred in the MCU 10A, the power management IC 13A detects the error, and outputs a reset signal RST1 to the MCU 10A.

The MCU 10A can detect the failure in the self-system. The MCU 10A may monitor the upper and lower limit values of the voltage or current in the driving circuit 11A. When the detected value of the voltage or current exceeds the upper or lower limit value, the MCU 10A may determine that an error has occurred in the driving circuit 11A. For the communication system, the MCU 10A monitors the transmission/reception timeout, and may determine an error, when the timeout has occurred. For the input system, the MCU 10A monitors the upper and lower limit values of the voltage, and may determine an error when it exceeds the limit value. The above-described detection of the failure or error is only one example, and is not to limit the means or technique of the detection.

The MCU 10B executes the same control operation for the driving circuit 11B and the power management IC 13B as that performed by the MCU 10A for the driving circuit 11A and the power management IC 13A. The control unit 22B outputs a control signal DRV2 for controlling the driving circuit 11B to the driving circuit 11B. The driving circuit 11B supplies a feedback current FC2 to the MCU 10B. The control unit 22B outputs an enable signal ENB2 for enabling or disabling the operation of the driving circuit 11B to the driving circuit 11B, in addition to the control signal DRV2. When an error has occurred in the MCU 10B, the power management IC 13B detects the error, and outputs a reset signal RST2 to the MCU 10B.

The motor driving apparatus 100 further includes a communication circuit 15 and a terminal T13. The communication circuit 15 is an interface circuit for communication between the MCUs 10A and 10B, and an ECU 20. The ECU 20 is another unit mounted on a vehicle.

When CAN is used for communication between the motor driving apparatus 100 and the ECU 20, the communication circuit 15 is a CAN transceiver IC. For example, information necessary for controlling the motor 5 is input from the ECU 20 to the terminal T13. This information is, for example, information regarding the vehicle speed. The MCUs 10A and 10B can calculate the target control amount of the motor 5 based on the vehicle speed information, in addition to the sensor information.

Figure 3:
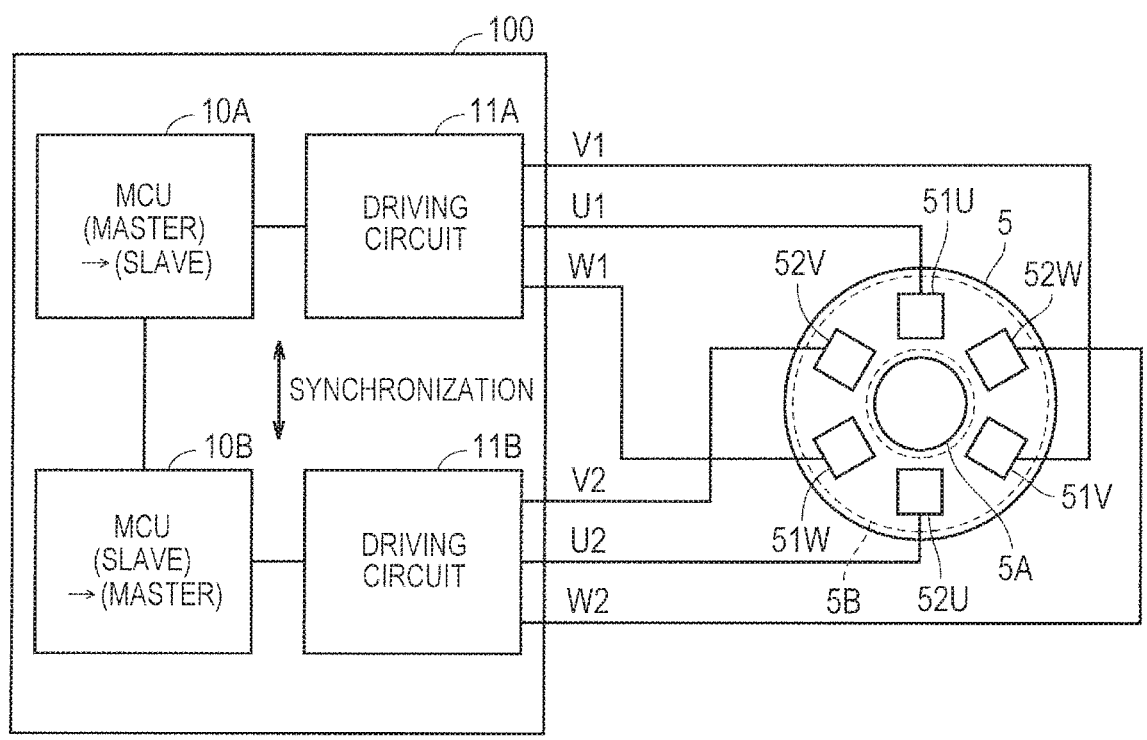
FIG. 3 is a diagram for schematically explaining an operation of the motor driving apparatus according to the first embodiment.

FIG. 3 is a diagram for schematically explaining the operation of the motor driving apparatus 100 according to the first embodiment. As illustrated in FIG. 3, in the stator 5B of the motor 5, six phase windings are arranged every 60° from the center of the rotor 5A. The driving circuit 11A drives a U-phase winding 51U, a V-phase winding 51V, and a W-phase winding 51W. The driving circuit 11B drives a U-phase winding 52U, a V-phase winding 52V, and a W-phase winding 52W. The U-phase winding 51U, the V-phase winding 51V, and the W-phase winding 51W are provided to form the first winding group 51, and are provided to form the U-phase winding 52U, the V-phase winding 52V, and the W-phase winding 52W (see FIG. 2).

At the operation of the electric power steering system 1, the torque output from the motor 5 is required to be large. For smooth movement of the motor 5A, the ripple of the torque is required to be small. Thus, for example, six-phase motor is used. To precisely control the six-phase motor by using two independent systems, two systems synchronously drive the winding groups of the motor 5.

In this embodiment, at the activation of the system (at the execution of the initialization process), one system is set in a master mode, and the other system is set in a slave mode. That is, the two systems are set respectively in the master mode and the slave mode. For example, the control mode of the MCU 10A is set in the master mode, while the control mode of the MCU 10B is set in the slave mode. The master MCU (MCU 10A) transmits a synchronous trigger signal representing the start point of control to the salve MCU (MCU 10B). Then, the salve can control the motor 5 in synchronization with the control by the master driving the motor 5.

When an error has occurred in the master, the master informs the salve of the error. The slave detects the error of the master by the information. The slave MCU switches the control mode to the master mode.

Occurrence of the error in the master corresponds to a case in which the motor 5 in the master mode cannot be kept driven. This case includes a case in which driving of the motor 5 by the slave cannot be synchronized with driving of the motor 5 by the master, and a case in which an error has occurred in the driving of the motor 5 by the master. When the slave cannot receive a synchronous trigger signal from the master, the driving of the motor 5 by the slave cannot be synchronized with the driving of the motor 5 by the master. In this case, the slave informs the master that an error has occurred in transmission of the synchronous trigger signal. Thus, the MCU (MCU 10A) of the master switches the control mode to the slave mode. As a result, the master and the slave are switched between the two systems. The new master (MCU 10B) transmits a synchronous trigger signal to the new slave (MCU 10A), and the new slave (MCU 10A) receives the synchronous signal. The driving system of the new master and the driving system of the new slave are normally operated, thereby enabling to continue the synchronous control.

Occurrence of the error in the driving of the motor 5 by the master corresponds to a case in which a failure has occurred, for example, in the driving circuit. In this case, the master stops the driving of the motor 5. The slave is the new master, and the new master drives the motor 5 by independent control, thereby enabling to continue driving of the motor 5.

As described above, each of the MCU 10A and the MCU 10B has the master mode and the slave mode as control modes, and can dynamically switch therebetween. When an error has occurred in the control of one MCU, the motor 5 can continuously be driven by the other MCU.

Figure 4:
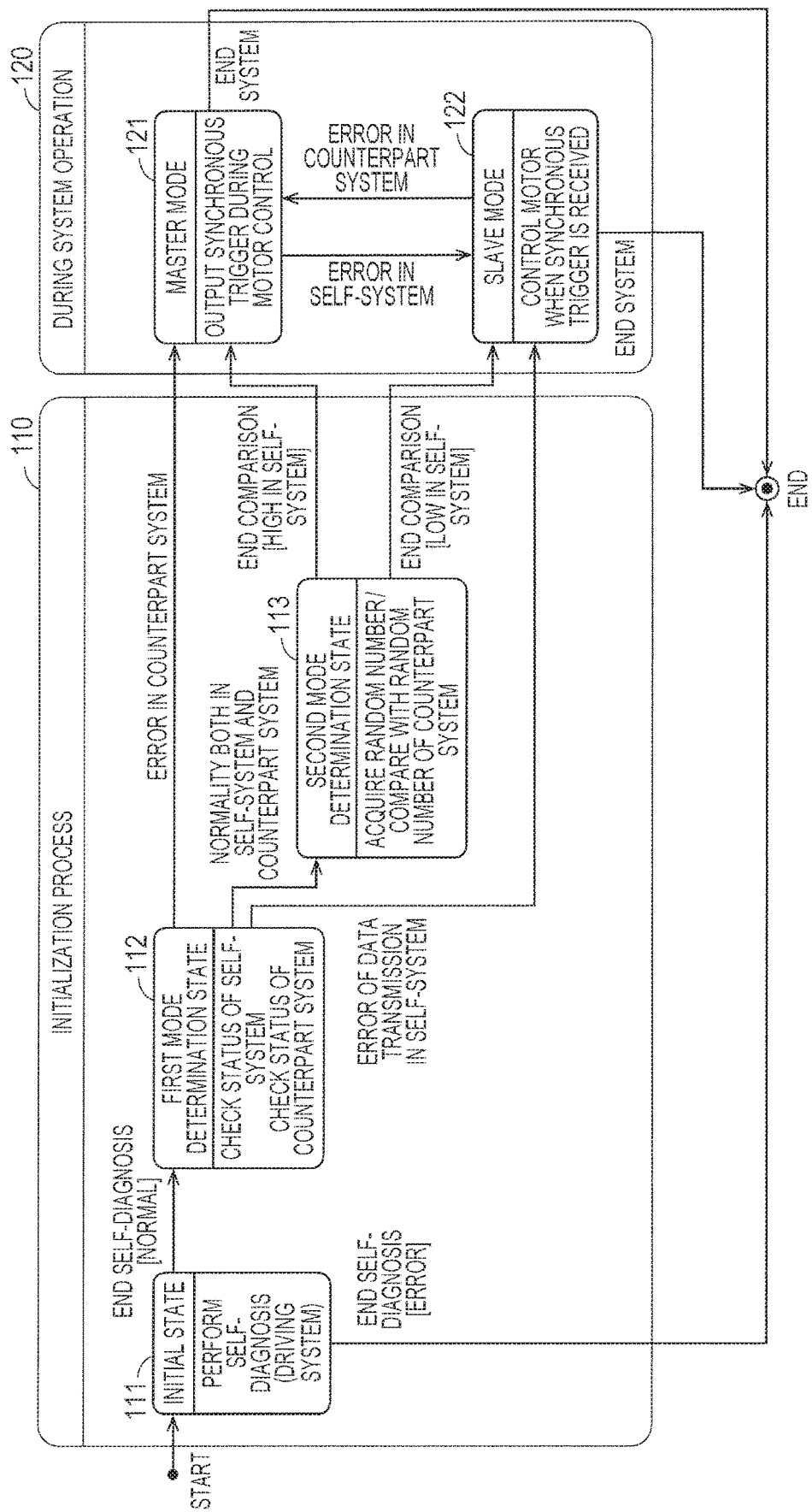
FIG. 4 is a state machine diagram illustrating a state transition of each system of the motor driving apparatus according to the first embodiment.

FIG. 4 is a state machine diagram illustrating a state transition of each system of the motor driving apparatus 100 according to the first embodiment. The state starts upon activation of the motor driving apparatus 100. Each of the systems transits to an initialization process state 110. The initialization process state 110 includes an initial state 111, a first mode determination state 112, and a second mode determination state 113.

In the initial state 111, a self-diagnosis (a diagnosis of, for example, a driving circuit) of the driving system is executed. When an error of the driving system is detected, the self-diagnosis ends, and the system transits to an end state. When the driving system is normally operated, in the first mode determination state 112, the state of the two systems is checked. One of the two systems is called a "self-system", while the other system opposed to the "self-system" is called a "counterpart system". When both of the self-system and the counterpart system are normally operated, in the second mode determination state 113, the self-system acquires a random value, and compares it with a random value acquired by the counterpart system. When the two random values are completely compared, each of the two systems transits to a during-system operation state 120. Each of the systems generates a random value, thereby preventing that one of the two systems is set always as the master (or slave).

The during-system operation state 120 includes a master mode state 121 and a slave mode state 122. For example, when the random value acquired by the self-system is greater than the random value of the counterpart system, the self-system is in the master mode state 121, and the counterpart system is in the slave mode state 122. When the random value acquired by the self-system is smaller than the random value of the counterpart system, the self-system is in the slave mode state 122, and the counterpart system is in the master mode state 121.

The system in the master mode state 121 outputs a synchronous trigger signal to the counterpart system, at the time of controlling the motor 5. On the other hand, the system in the slave mode state 122 receives the synchronous trigger signal, and control the motor 5. When an error has occurred while the self-system is in the master mode state 121, the self-system transits to the slave mode state 122. When an error has occurred while the self-system is in the slave mode state 122, the self-system transits to the master mode state 121.

In the first mode determination state 112, when the error of the counterpart system is detected, the self-system transits to the master mode state 121. In the first mode determination state 112, when the error (error in communication) of the self-system is detected, the self-system transits to the slave mode state 122. When an error has occurred in the MCU of the self-system, at the time the self-system is in the slave mode state 122, the self-system stops controlling the motor 5.

Descriptions will now be made to a process executed by the system in each state of FIG. 4. Those processes as will hereinafter be described are mainly executed by the MCU of each system. In the following descriptions, when there is no need to specify the MCU 10A and the MCU 10B, the MCU 10A and the MCU 10B will collectively be called "MCU".

Figure 5:
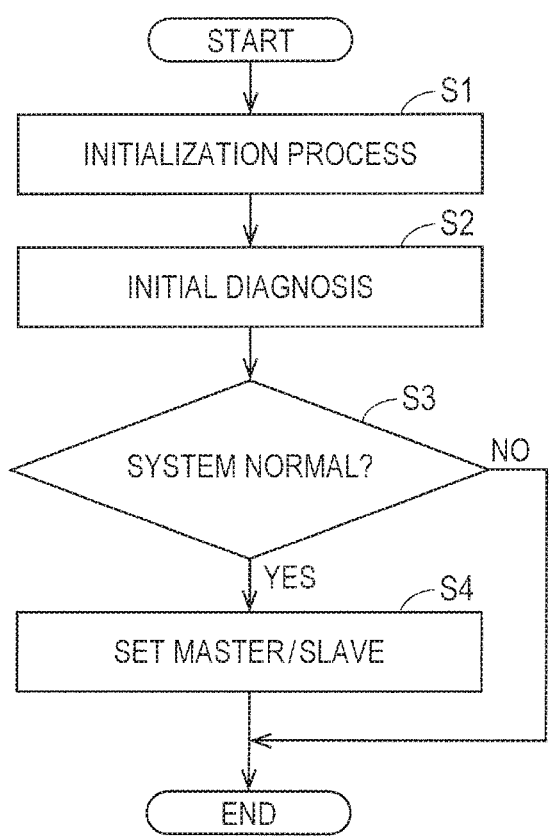
FIG. 5 is a flowchart illustrating a flow of an initialization process executed at the activation of the system.

FIG. 5 is a flowchart illustrating a flow of an initialization process executed at the activation of the system. The initialization process is executed only once at the activation of the system, and will not be executed until the next activation of the system.

As illustrated in FIG. 5, the initialization process (Step S1) is executed. In the initialization process, there is executed a process for acquiring a random value, in addition to a basic process for initializing the memory and initial setting. Various methods are applicable to acquisition of the random value. In one example, the random value generated by the power management IC is acquired by the MCU.

Next, an initial diagnosis (Step S2) is executed. The flow of the initial diagnosis will specifically be described by reference to FIG. 6.

In Step S3, a result of the initial diagnosis is judged. When it is judged that the system is normal (YES in Step S3), in Step S4, setting of "master/slave" is executed. Then, the system is set exclusively either in the master mode status or the slave mode status.

As a result of the initial diagnosis, when it is judged that the system is not normal (NO in Step S3), the initialization process ends. Thereafter, it is inhibited from controlling the motor of the system.

Figure 6:
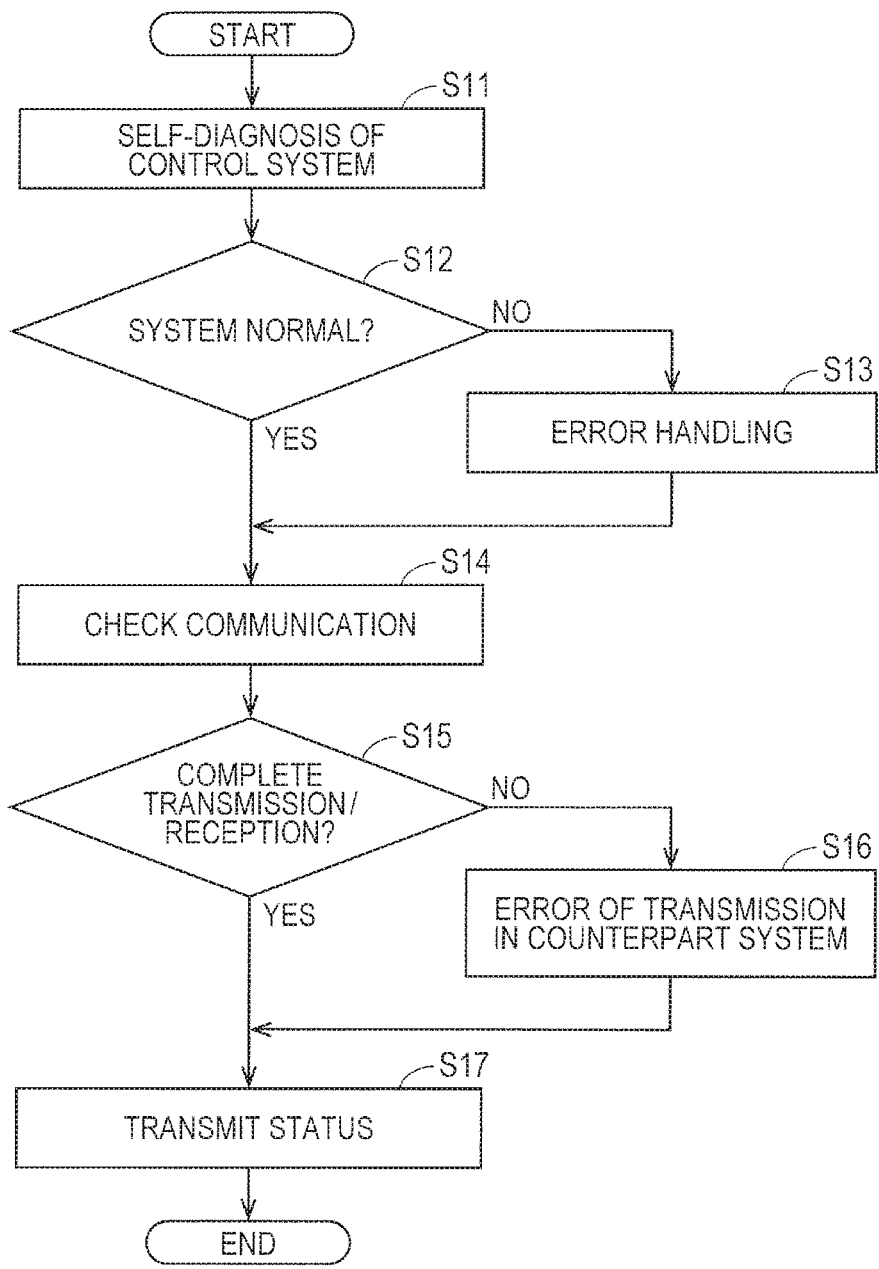
FIG. 6 is a flowchart illustrating a flow of an initial diagnosis process.

FIG. 6 is a flowchart illustrating a flow of an initial diagnosis process. In the initial diagnosis process, the self-diagnosis of the control system is executed (Step S11). In the self-diagnosis, a diagnosis is performed on whether a failure is made in each terminal of the MCU, the internal register of the MCU, and the peripheral IC of the MCU.

The MCU determines whether the system is normal based on the result of the self-diagnosis (Step S12). When it is judged that the system is erroneous (NO in Step S12), the MCU executes an error handling (Step S13). That is, it is inhibited from controlling the motor.

When the system is normal (YES in Step S12), a communication check process is executed (Step S14). In the communication check process, the MCU 10A and the MCU 10B diagnose a communication path therebetween. The communication path between the MCUs 10A and 10B is the entire part for the communication therebetween, and includes a communication units (the communication units 23A and 23B illustrated in FIG. 2) of each MCU, the wiring pattern and the connector between the communication units 23A and 23B. Bidirectional data communication can be realized between the MCUs 10A and 10B, and there is no particular restriction on the method for data transmission/reception and also the number of signal lines necessary for executing the method. For example, when an SPI is applied for communication between the MCUs 10A and 10B, the SDO of one MCU and the SDI of the other MCU are coupled with each other. It is possible to perform both data transmission and reception in synchronization with the clock between the two MCUs.

The MCU determines whether data transmission/reception has been completed (Step S15). Upon completion of the data transmission/reception, a communication path between the MCUs 10A and 10B is normal. However, when some kind of error has occurred, data transmission/reception is not completed. In this case, the timeout period is set, and it is determined as to whether an error has occurred in the communication path of the MCUs 10A and 10B. The error of the communication path includes, for example, decoupling of terminals, decoupling of wiring patterns, and decoupling of connectors.

In the case of occurrence of timeout (NO in Step S15), it is determined that transmission of counterpart system is erroneous (Step S16). The MCUs 10A and 10B transmit information regarding the status of the communication path with each other (Step S17). In this case, information regarding the error of the transmission of the counterpart system is shared between the MCUs 10A and 10B.

Figure 7:
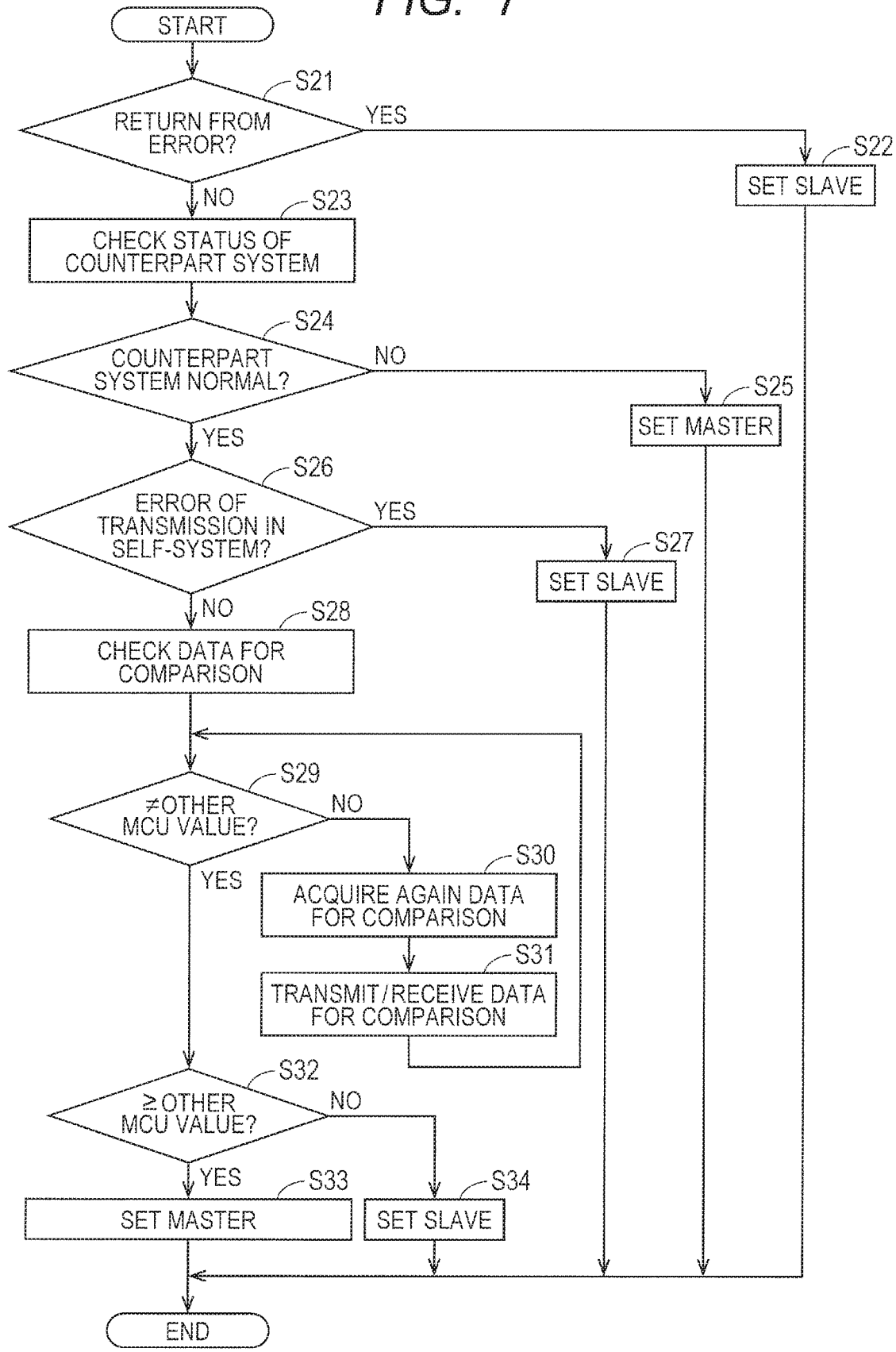
FIG. 7 is a flowchart illustrating a flow of a master/slave setting process.

FIG. 7 is a flowchart illustrating a flow of a master/slave setting process. First, the MCU checks whether the self-system has returned from the error (Step S21). This process will specifically be made described later. When the self-system returns from the error, the MCU performs slave setting (Step S22). That is, the control mode of the MCU is set to the slave mode, while the self-system is in the slave mode. In the other case, the MCU acquires information of the status from the counterpart system (Step S23), and checks whether the counterpart system is normal (Step S24).

When a failure has occurred in the driving system of the counterpart system (NO in Step S24), the MCU performs master setting (Step S25). The control mode of the MCU is set to the master mode, while the self-system being normal is in the master mode.

When the counterpart system is normal (YES in Step S24), the MCU of the self-system checks the result of the communication check, and checks whether transmission of the self-system is erroneous. When the transmission of the self-system is erroneous, that is, when the counterpart system determines that data transmission of the self-system is erroneous (YES in Step S26), the MCU of the self-system performs slave setting (Step S27). When the transmission of the self-system is normal (NO in Step S26), the control system and the communication system of the self-system are normal. In this case, the mutual systems compare the random values acquired in the initialization process, thereby performing the master/slave setting (Steps S28 to S34).

The self-system and the counterpart system check the random values as data for comparison (Step S28). One MCU determines whether its random value differs from the random value of the MCU of the other MCU (Step S29). When two random values are the same (NO in Step S29), each of the MCUs 10A and 10B acquires again the random value as data for comparison (Step S30). Each of the MCUs 10A and 10B transmits the acquired random value to the other MCU, receives the random value from the other MCU (Step S31), and executes a determination procedure of Step S29. According to another applicable method, each of the MCUs 10A and 10B acquires a plurality of random values in advance, and compares the second data items with each other, if the first data items are the same.

When two random values are different from each other (YES in Step S29), the self-MCU determines the relation of the random value of the self-MCU and the random value of the other MCU (Step S32). When the random value of the self-MCU is greater than the random value of the other MCU (YES in Step S32), the self-MCU performs master setting (Step S33). When the random value of the self-MCU is smaller than the random value of the other MCU (NO in Step S32), the self-MCU performs slave setting (Step S34).

Figure 8:
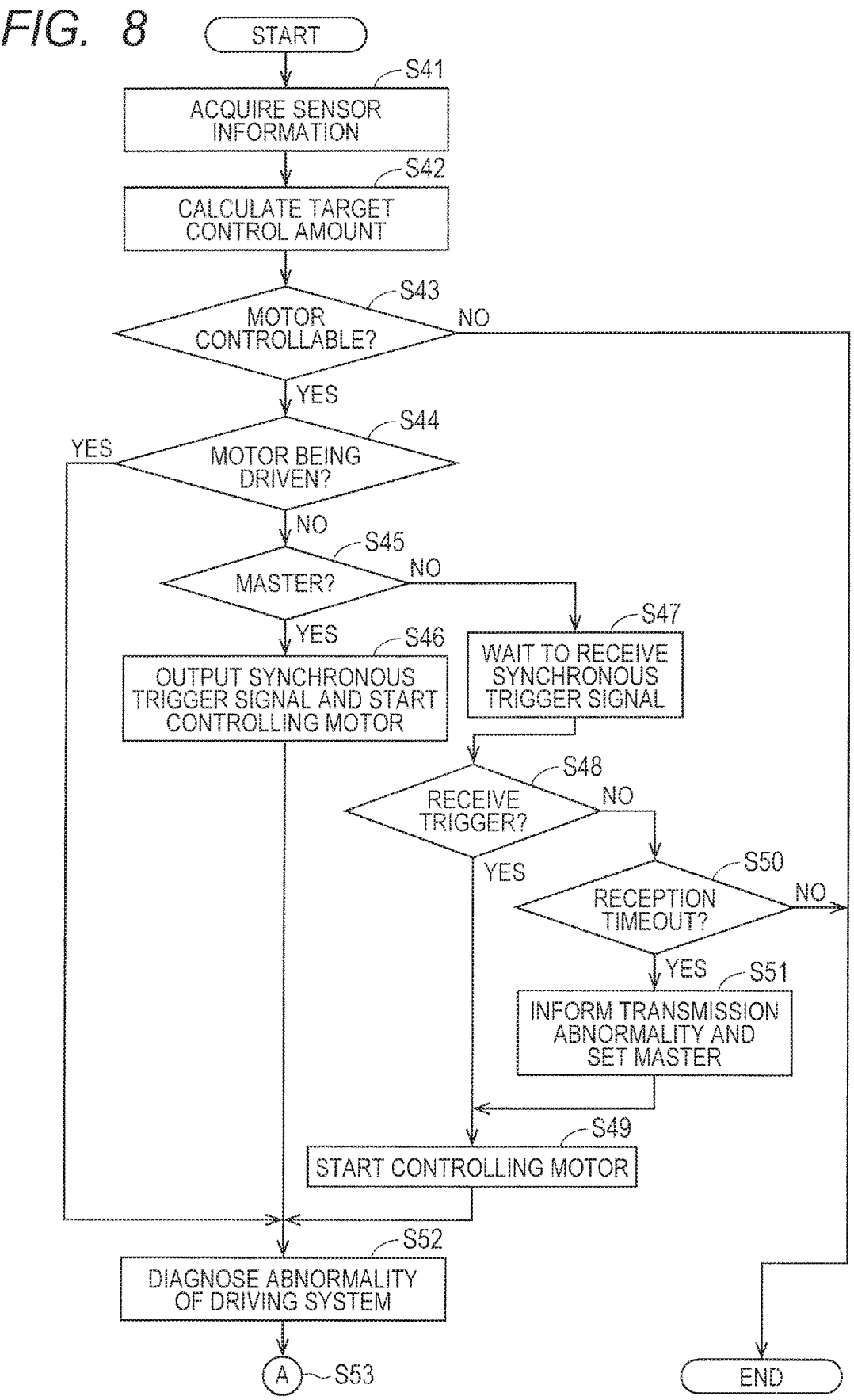
FIG. 8 is a first flowchart illustrating a flow of a motor control process.
Figure 9:
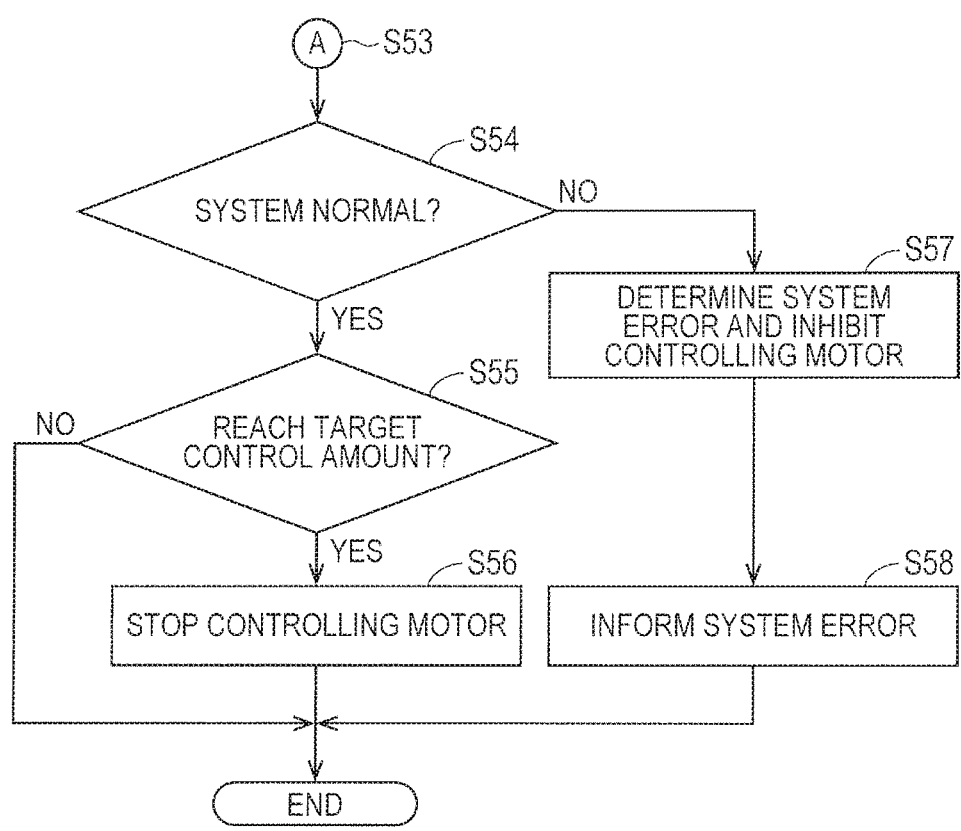
FIG. 9 is a second flowchart illustrating a flow of a motor control process following the flow of FIG. 8.

As a result that the control mode of each of the MCUs 10A and 10B is set, the mode of the system is set, and the control of the motor 5 is executed. FIG. 8 is a first flowchart illustrating a flow of a motor control process. FIG. 9 is a second flowchart illustrating a flow of a motor control process following the flow of FIG. 8. Those processes illustrated in FIG. 8 and FIG. 9 are repeatedly executed at predetermined cycles.

By reference to FIG. 8 and FIG. 9, the MCU acquires external sensor information from the external sensor 8 through the input circuit (Step S41). The MCU calculates a target control amount based on the external sensor information (Step S42). The calculation of the target control amount is executed by the calculation unit of the MCU.

Then, the MCU checks whether the motor 5 can be controlled (Step S43). When it is judged that the self-system is erroneous (NO in Step S43), the process of this flow ends. When the motor 5 can be controlled (YES in Step S43), the MCU checks whether the motor 5 is being driven (Step S44). That is, the MCU checks whether this control cycle is the first control cycle. When it is the first control cycle (NO in Step S44), it is determined whether the control mode of the MCU is set to the master mode (Step S45). When the control mode of the MCU is set to the master mode (YES in Step S45), the MCU outputs a synchronous trigger signal to start controlling the motor (Step 46).

When the control mode of the MCU is set to the slave mode (NO in Step S45), the MCU of the self-system is in a status of waiting for reception of the synchronous trigger signal (Steps S47 and S48). When the synchronous trigger signal is normally received from the MCU master of the counterpart system (YES in Step S48), the MCU starts controlling the motor with using the synchronous trigger signal as a trigger (Step S49). By the procedures of Step S46 and S49, the motor 5 can synchronously be controlled with the master and the slave.

When the MCU cannot receive the synchronous trigger signal (NO in Step S48), the MCU sets the time of reception timeout, and checks whether the timeout has occurred (Step S50). When the timeout period expires, because the synchronous trigger signal is not received (YES in Step S50), the MCU informs the counterpart system (master) about the transmission error, and also performs the master setting (Step S51). In this case, the MCU is set in the master mode, and starts controlling the motor (Step S49). When the reception timeout has occurred (NO in Step S50), the controlling of the motor ends. Note, during the system operation, when the MCU of the master receives the transmission error of the MCU of the master from the MCU of the slave, the MCU of the master stops controlling the motor. As a result of this, it is possible to switch the controlling of the motor from the master to the slave at an appropriate timing.

In the status where controlling of the motor 5 starts, the MCU diagnoses the error of the driving system (Step S52). The process progresses to Step S53, in which it is checked whether the system is normal, by reference to FIG. 9 (Step S54). When the system is normal (YES in Step S54), it is determined whether the control amount of the system has reached a target control amount (Step S55). When the control amount of the system has reached the target control amount (YES in Step S55), the MCU stops controlling the motor (Step S56), and the motor control process ends. When the control amount of the system has not reached the target control amount yet (NO in Step S55), the motor control process is repeated from Step S41.

When the system is not normal (NO in Step S54), the MCU determines that it is erroneous, and it is inhibited from controlling of the motor (Step S57). The MCU informs the counterpart system of the error of the self-system (Step S58).

Figure 10:
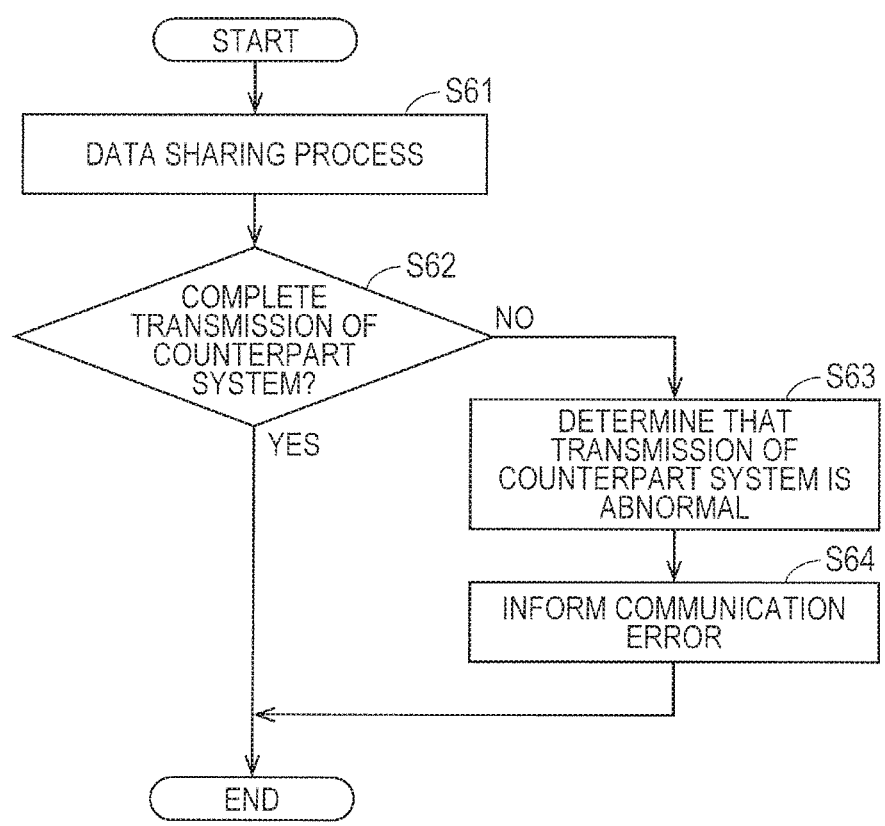
FIG. 10 is a flowchart illustrating a flow of a communication check process.

The MCU executes regularly executes a communication check process independently from the motor control process illustrated in FIG. 8 and FIG. 9. FIG. 10 is a flowchart illustrating a flow of a communication check process. By reference to FIG. 10, the MCU of the self-system executes a process for sharing data with the MCU of the counterpart system (Step S61), and determines whether data transmission has been completed (Step S62). When data transmission has been completed (YES in Step S62), communication between the systems is normal. When data transmission has not been completed (NO in Step S62), the MCU of the self-system (for example, MCU 10B) determines that an error has occurred in transmission of the MCU (for example, MCU 10A) of the counterpart system, and informs the counterpart system of a transmission error (Step S63, S64).

The process illustrated in FIG. 10 continues until sharing of their status is completed, regardless of occurrence of the error. Because the system which has been judged to be erroneous by this process cannot transmit data to the communication target, it is not suitable as a system for continuing the operation. Thus, the MCU (for example, MCU 10B) of the system which can transmit data switches the control mode from the slave mode to the master mode.

Figure 11:
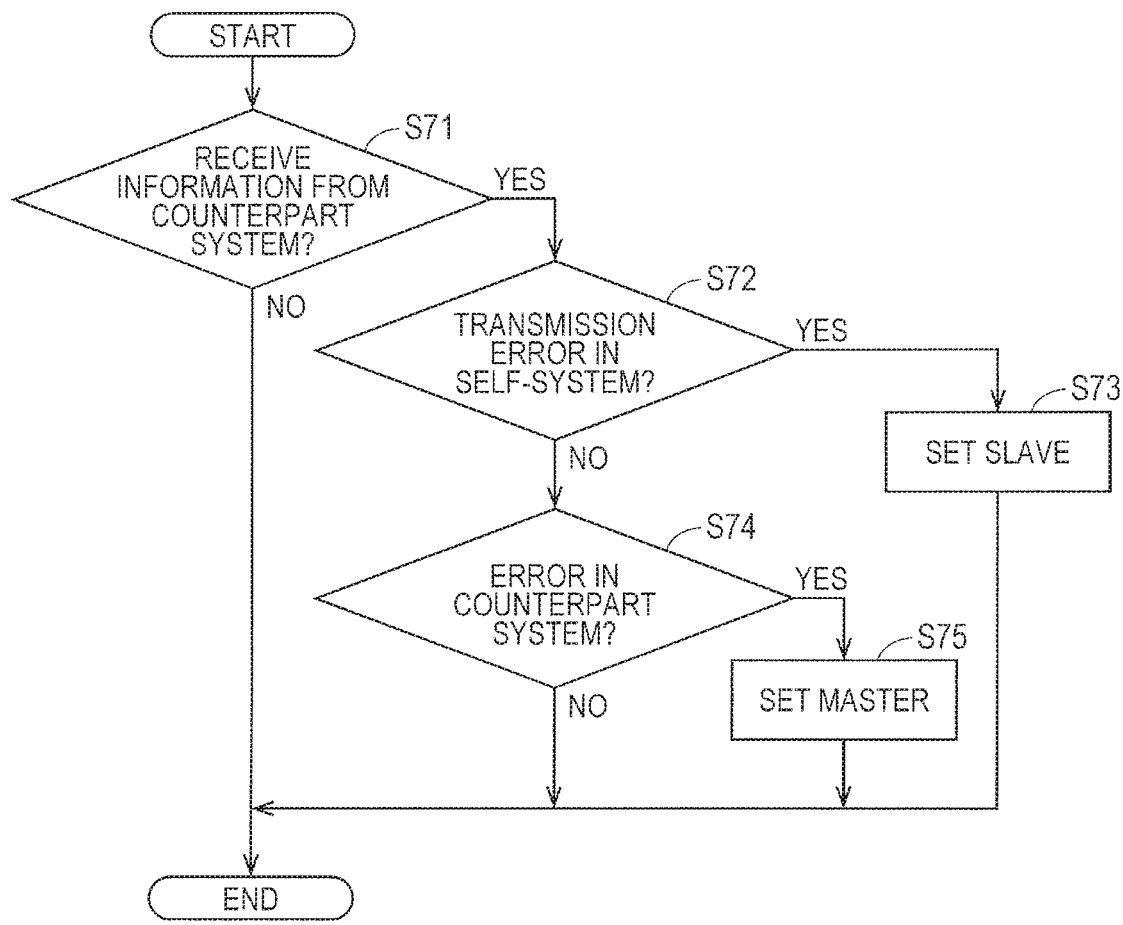
FIG. 11 is a flowchart illustrating a flow of an immediate notification process from a counterpart system to a self-system.

Further, when an error has occurred in the counterpart system, the information is transmitted immediately from the counterpart system to the self-system. FIG. 11 is a flowchart illustrating a flow of an immediate notification process from the counterpart system to the self-system. In this embodiment, there are following two kinds of immediate notification processes.

(1) Immediate notification from the counterpart system to the self-system, when the self-system is a master, when the counterpart system is a slave, and when the counterpart system (slave) cannot receive a synchronous trigger signal for a predetermined period time from the self-system (master).

(2) Immediate notification from the counterpart system to the self-system, when the counterpart system detects occurrence of a failure at a level that the motor control should be inhibited, in the counterpart system.

The immediate notification process is executed by the self-system when notification is made from the counterpart system, using an interruption function. As illustrated in FIG. 11, the MCU of the self-system determines whether immediate notification is received from the counterpart system (Step S71). When the self-system has not received the immediate notification from the counterpart system (NO in Step S71), the process ends. When the self-system has received the immediate notification from the counterpart system (YES in Step S71), the MCU of the self-system determines whether this immediate notification represents an error in the transmission of the synchronous trigger signal by the self-system (Step S72).

When there is an error in the transmission of the synchronous trigger signal by the self-system (YES in Step S72), the MCU of the self-system stops controlling the motor and performs the slave setting (Step S73). In this case, the counterpart system becomes the master, while the self-system becomes the slave. The new master can transmit a synchronous trigger signal to the new slave, while the new slave can receive the synchronous signal. Because the driving system of the new master and the driving system of the new slave are both normal, it is possible to continue the synchronous control.

When the immediate notification does not represent an error in the transmission of the synchronous trigger signal by the self-system (NO in Step S72), the self-system determines whether the immediate notification represents an error of the counterpart system (Step S74). When an error has occurred in the counterpart system (YES in S74), the self-system judges that the counterpart system cannot perform the synchronous control of the motor 5. Thus, the MCU of the self-system performs the master setting (Step S75). In this case, it is possible to continue controlling the motor 5 only by the self-system.

Figure 12:
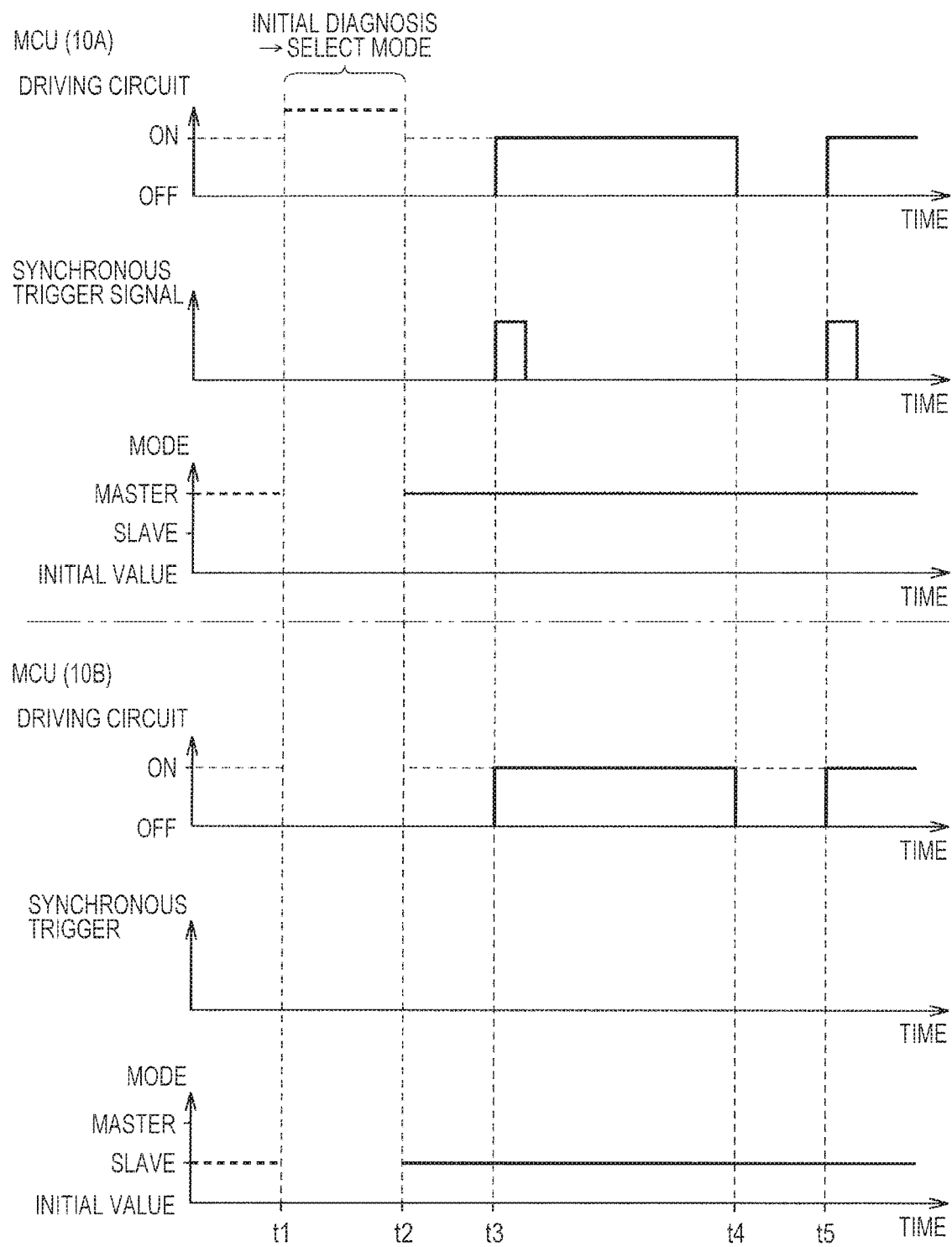
FIG. 12 is a timing chart for explaining synchronous control of a motor 5 when both of a master and a slave are normally operated.

FIG. 12 is a timing chart for explaining synchronous control of the motor 5, when both of the master and the slave are normal. By reference to FIG. 12, when the system is activated, the initialization processes illustrated in FIG. 5, FIG. 6, and FIG. 7 start at a time t1, and then the initial diagnosis and the mode selection process are executed. The initialization process ends at a time t2. In the following descriptions, let it be assumed that the MCU 10A is set in the master mode, and the MCU 10B is set in the slave mode.

The motor control process illustrated in FIG. 8 and FIG. 9 is repeatedly executed at a predetermined cycle. At a time t3, the MCU 10A executes the procedures of Steps 45 and S46 illustrated in FIG. 8. The MCU 10A outputs a synchronous trigger signal representing the start point of the control, and also turns on the driving circuit 11A. The MCU 10B executes the procedures of Steps S47, S48, and S49 illustrated in FIG. 8. In response to the synchronous trigger signal, the MCU 10B turns on the driving circuit 11B. "Turning on the driving circuit" implies that each of the MCU 10A and MCU 10B starts controlling its corresponding driving circuit.

The control by the MCU 10A and MCU 10B ends at a time t4, and the driving circuits 11A and 11B are turned off at the time t4. Thus, the motor 5 once stops. At a time t5, the controlling of the motor starts again. At a time t5, the MCU 10A outputs a synchronous trigger signal, and turns on the driving circuit 11A. In response to the synchronous trigger signal, the MCU 10B turns on the driving circuit 11B.

Figure 13:
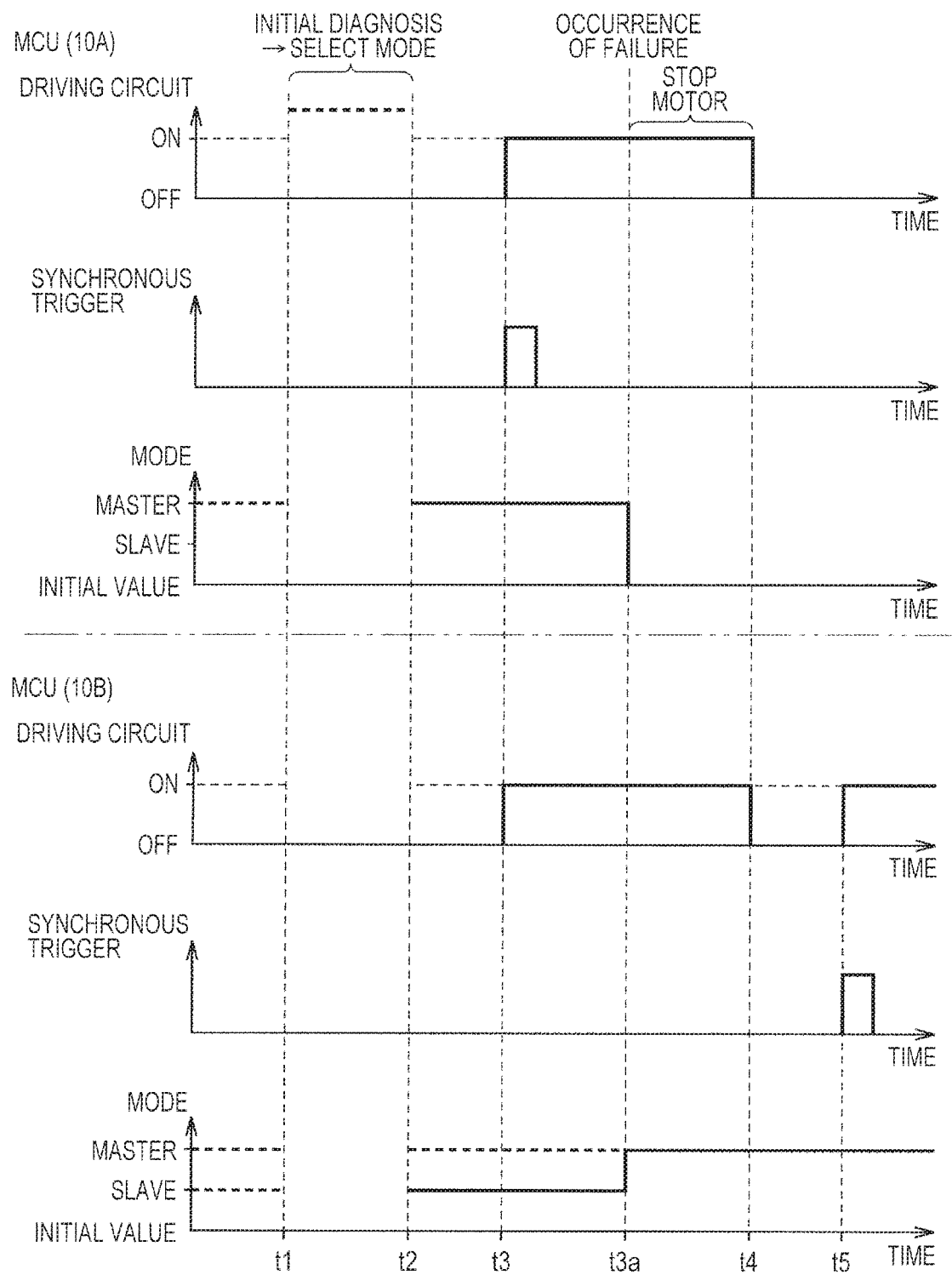
FIG. 13 is a timing chart for explaining control of the motor driving apparatus according to the first embodiment, when an error has occurred in the driving system of the master side.

FIG. 13 is a timing chart for explaining control of the motor driving apparatus 100 according to the first embodiment, when an error has occurred in the driving system on the master side. The procedures at and before the time t3 have already been described by reference to FIG. 12, and thus will not hereinafter be described over and over.

At a time t3a, a failure occurs in the driving system (for example, the driving circuit 11A) on the master side. In this case, the MCU 10A executes the procedure of Step S52 illustrated in FIG. 8 the procedures of Step S53, S54, and S57 illustrated in FIG. 9. It is inhibited that the master controls the motor. By executing the procedure of S58, the MCU 10A informs the MCU 10B of the system error. The value representing the mode is initialized.

In a period since the time t3a until the time t4, the motor control stops. If the driving circuit 11A is turned off at the time t4, it remains off.

The MCU 10B executes the procedures of Steps S71, S72, S74, and S75 illustrated in FIG. 11. As a result, the MCU 10B switches the control mode from the slave mode to the master mode. The next control starts at a time t5. The MCU 10B as a new master outputs a synchronous trigger signal representing the start point of the control, and also turns on the driving circuit 11B. In this case, the motor 5 is controlled only by the new master.

Figure 14:
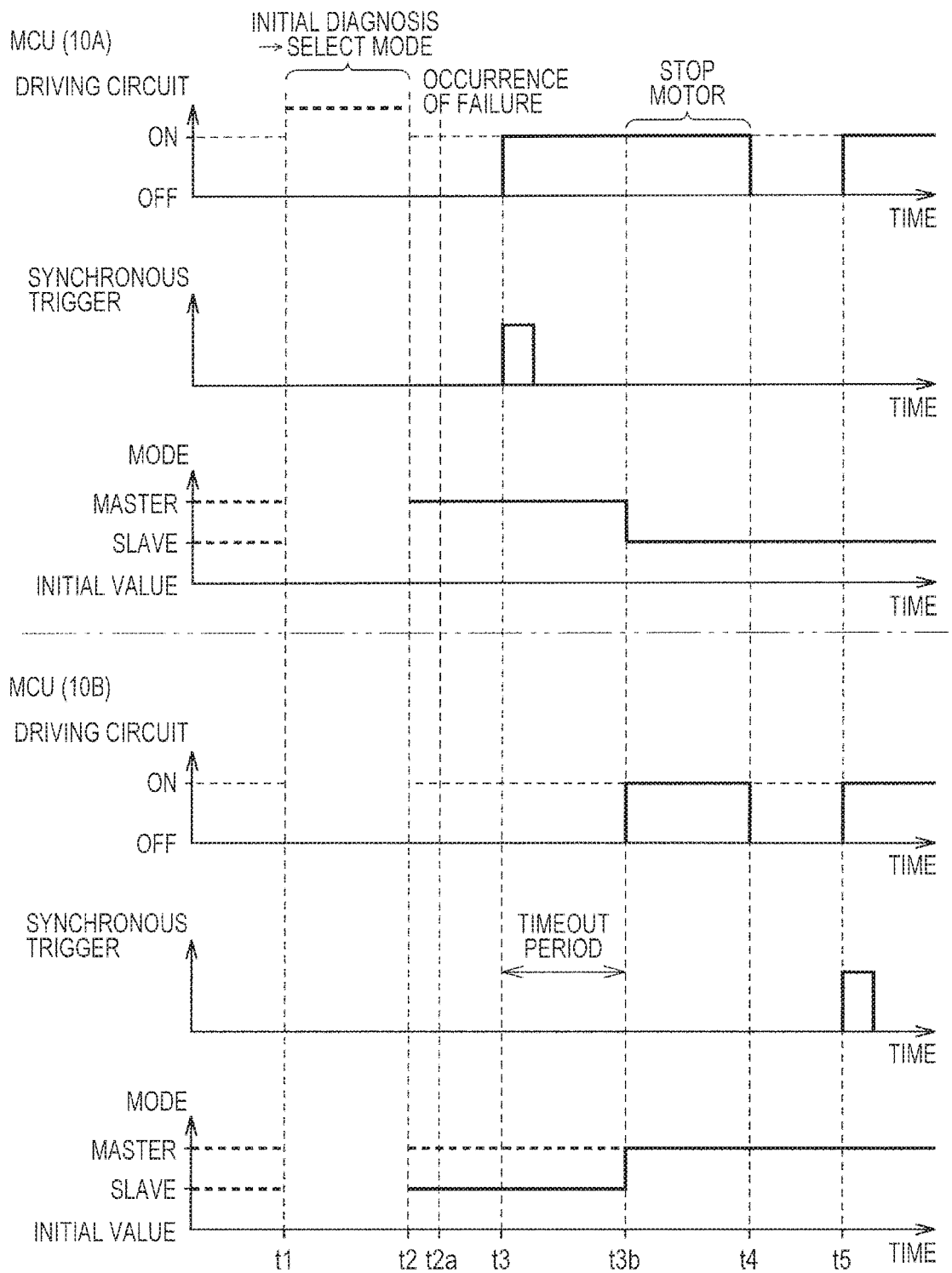
FIG. 14 is a timing chart for explaining control of the motor driving apparatus according to the first embodiment, when an error has occurred in the communication system of the master side.

FIG. 14 is a timing chart for explaining control of the motor driving apparatus according to the first embodiment, when an error has occurred in the communication system of the master side. In FIG. 14, at a time t2a, an error has occurred in the data transmission from the MCU 10A to the MCU 10B. In this case, even if the MCU 10A outputs a synchronous trigger, the MCU 10B cannot receive the synchronous trigger signal. During a period which has been set as a timeout period since the time t3 as the start time of the control cycle, the MCU 103 waits for a synchronous trigger signal. However, at the time t3, the timeout occurs. The MCU 10B executes procedures of Steps S47, S48, S50, and S51 illustrated in FIG. 8. As a result, the MCU 10B switches the control mode from the slave mode to the master mode. Further, the MCU 10B informs the MCU 10A of the error of the communication system.

The MCU 10A executes the procedures of Steps S71, S72, and S73 illustrated in FIG. 11. As a result, the MCU 10A switches the control mode from the master mode to the slave mode.

The MCU 10B executes the procedure of Step S49 illustrated in FIG. 8 at a time tab. Therefore, the driving circuit 11B is turned on, thereby starting the motor control.

At a time t5, the next control cycle starts. The MCU 10B as the new master outputs a synchronous trigger signal, and turns on the driving circuit 11B. The path through which the MCU 10A receives data from the MCU 10B is normal. Therefore, the MCU 10A can receive the synchronous trigger signal from the MCU 10B. In response to the synchronous trigger signal from the MCU 10B, the MCU 10A turns on the driving circuit 11A. As a result, at and after the time t5, the synchronous control can be continued.

When the master and the slave are fixed, if an error occurs in the master, it is not possible to continue controlling the master 5. According to the motor driving apparatus 100 according to the first embodiment, when the MCU on the master side cannot output a synchronous trigger, the MCU on the slave side detects the transmission error of the master. The MCU on the slave side informs the MCU on the master side of the transmission error of the master. In this case, it is possible to switch the master and the slave from each other at an appropriate timing. When there is error in the driving system of the original master, the original master is the new slave, and can execute the motor control. Thus, even after the master and the slave are switched from each other, it is possible to continue the synchronous control of the motor 5.

When the driving system of one system of the master and the slave cannot drive the motor, the motor 5 can continuously drive the motor 5 using the other system. Thus, the motor driving apparatus 100 according to the first embodiment can realize the duplicate driving systems.

Alternatively, it can be considered that the master possibly returns from a temporary failure. When the master and the slave are fixed, the motor control by the slave can appropriately be continued. As a result that the master returns from the failure, it outputs again a synchronous trigger signal when the control starts. To safely return for the synchronous control, it is necessary to restart the process for synchronization. However, it may be necessary to once stop the motor control on the slave side. According to the first embodiment, in this case, the other system which can control the motor and can output the synchronous trigger is switched from the slave to the master. The system in which the error has occurred is set to the slave, at the time of returning from the error (see Steps S21 and S22 of FIG. 7). As a result, it is possible to appropriately return for the synchronous control of the motor. For example, in the vehicle control system illustrated in FIG. 1, it is possible to eliminate an effect on the vehicle behavior.

Second Embodiment

Figure 15:
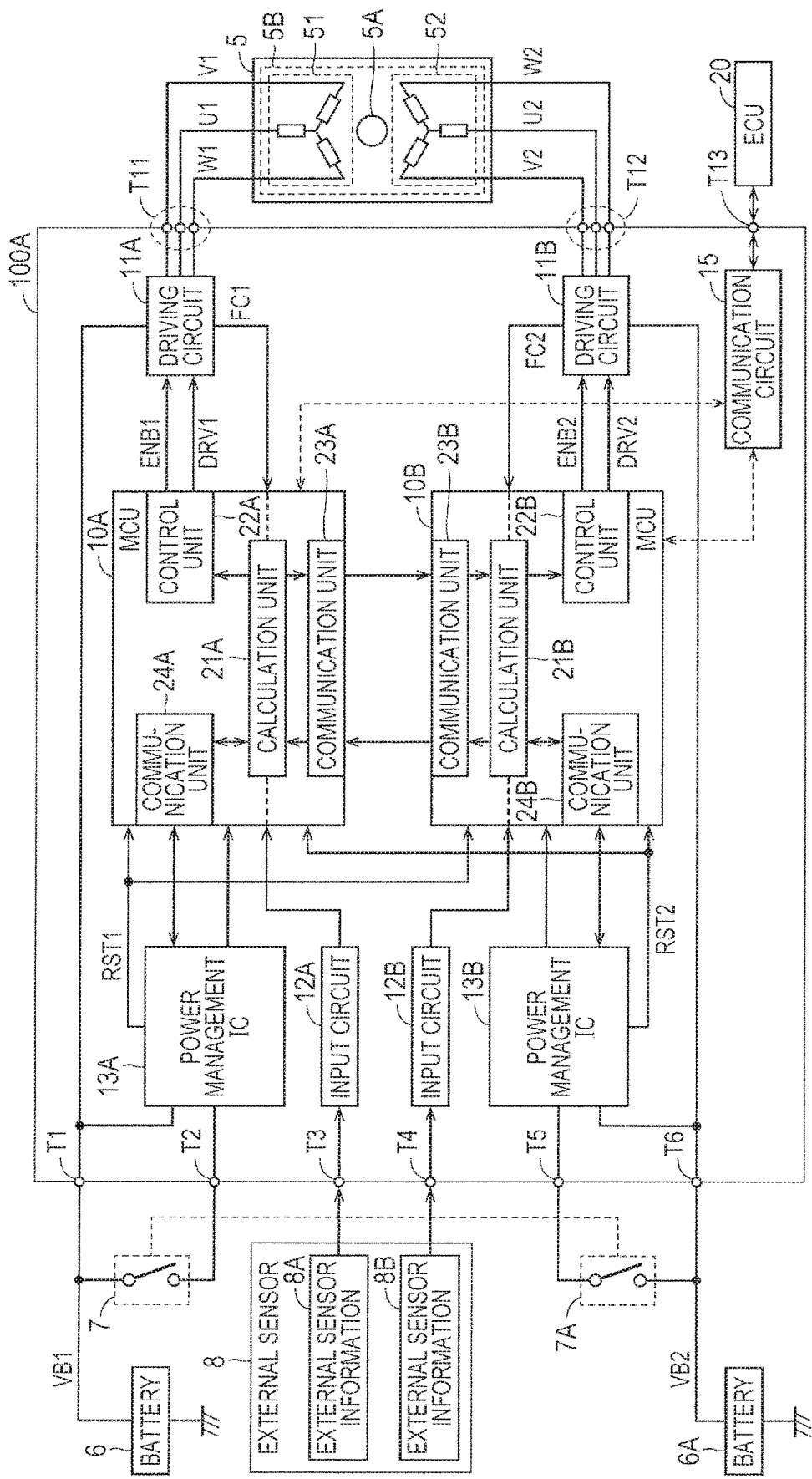
FIG. 15 is a block diagram illustrating an approximate configuration of a motor driving apparatus according to a second embodiment.

FIG. 15 is a block diagram illustrating an approximate configuration of a motor driving apparatus according to the second embodiment. The same configuration as that illustrated in FIG. 2 will not be described over and over. As illustrated in FIG. 15, in the second embodiment, a battery and a switch are provided for each of the two systems. Thus, there are provided independent power source systems: for the MCU 10A, the driving circuit 11A, and the power management IC 13A; and for the MCU 10B, the driving circuit 11B, and the power management IC 13B.

The motor driving apparatus 100A has terminals T5 and T6, in addition to the configuration of the motor driving apparatus 100. A battery 6A is coupled to the terminal T6. A switch 7A is coupled between the battery 6A and the terminal 5. The driving circuit 11B is coupled to the terminal T6, and the power management IC 13B is coupled to the terminal T5.

The switch operates with the switch 7. For example, if the user (driver of the vehicle) turns on the switch 7, the switch 7A is turned on with it. As a result, a DC voltage VB2 is supplied from the battery 6A to the power management IC 13B. The ON status and the OFF status of the switch correspond to the ON status and the OFF status of the switch 7A. The driving circuit 11B converts the DC voltage VG2 from the battery 6A into a three-phase AC voltage.

In the second embodiment, a reset signal output from the power management IC is input to the MCU of the self-system and the MCU of the counterpart system. That is, each of the reset signals RST1 and RST2 is input to both of the MCUs 10A and 10B. In response to the reset signal from the counterpart system, the self-system detects that the counterpart system has been reset. Each of the MCUs has a terminal for receiving the reset signal for the self-system and a terminal for receiving the reset signal for the counterpart system. Because the reset signals are input to different terminals, it is prevented that the self-system is reset by the reset signal for the counterpart system.

The basic operation of the motor driving apparatus 100A according to the second embodiment is the same as that of the motor driving apparatus 100 according to the first embodiment (see FIG. 4 to FIG. 14). Each of the MCUs can basically detect the error of the self-system. However, due to some reason, such as the runaway of the MCU, the MCU may not possibly detect the error of the self-system.

Further, in the configuration of the first embodiment, when the power source supply line is decoupled between the battery 6 and the motor driving apparatus 100, no power source is supplied both to the internal two systems of the motor driving apparatus 100. That is, it cannot ensure continuation of the operation of the motor 5, in accordance with one failure.

According to the second embodiment, by providing the battery for each system, the power source systems are independently provided for the two systems. As a result, even if an error has occurred in one system, it is possible to continue controlling the motor 5 by the other system.

When an error has occurred in the system, the reset signal for resetting the MCU is output from the power management IC. In the second embodiment, upon reception of a reset signal from the counterpart system, the self-system detects occurrence of the error in the counterpart system. When the self-system is in the slave mode, the self-system is switched to the master mode, upon reception of a reset signal from the counterpart system. As a result, it is possible to control the motor 5.

Figure 16:
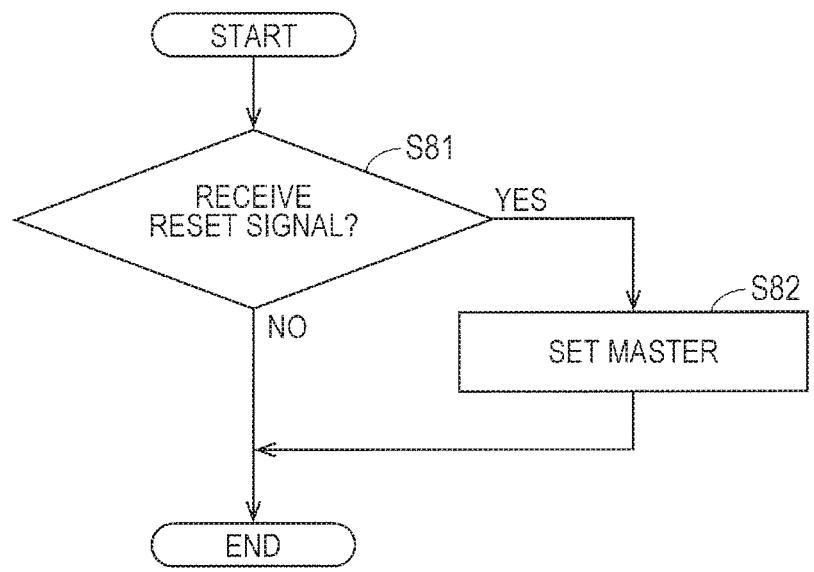
FIG. 16 is a flowchart illustrating a flow of control of a self-system, at the time of receiving a reset signal from a counterpart system.

FIG. 16 is a flowchart illustrating a flow of control of the self-system, at the time of receiving the reset signal from the counterpart system. This process is executed at, for example, predetermined cycles. As illustrated in FIG. 16, in Step S81, the MCU determines whether the reset signal is received from the counterpart system. When the MCU does not receive the reset signal from the counterpart system (NO in Step S81), the entire process ends. When it receives the reset signal from the counterpart system (YES in Step S81), the MCU performs the master setting (Step S82). When the self-system has already been set in the master mode, the mode of the self-system is checked, in Step S82, and the process may end.

In one case of receiving the reset signal, the system may also be reset at the time of power supply/decoupling, other than the occurrence of failure. Until the master/slave setting process is completed, the system is configured not to execute the process illustrated in FIG. 16. The MCU is preferably configured to execute the process illustrated in FIG. 16 in response to the reset signal which has been generated in a particular period after completion of the master/slave setting process.

The reset MCU executes the initialization process flow illustrated in FIG. 5. When the initialization process is normally completed, the MCU executes the master/slave setting process illustrated in FIG. 7. In this case, the system has returned from the error, the process progresses to Steps S21 and 22, and the slave setting is performed. A check as to whether returning from the error can be made by checking as to whether the reset is, for example, power-on reset. Note that there is no restriction on the method and means for checking the return from the error.

Figure 17:
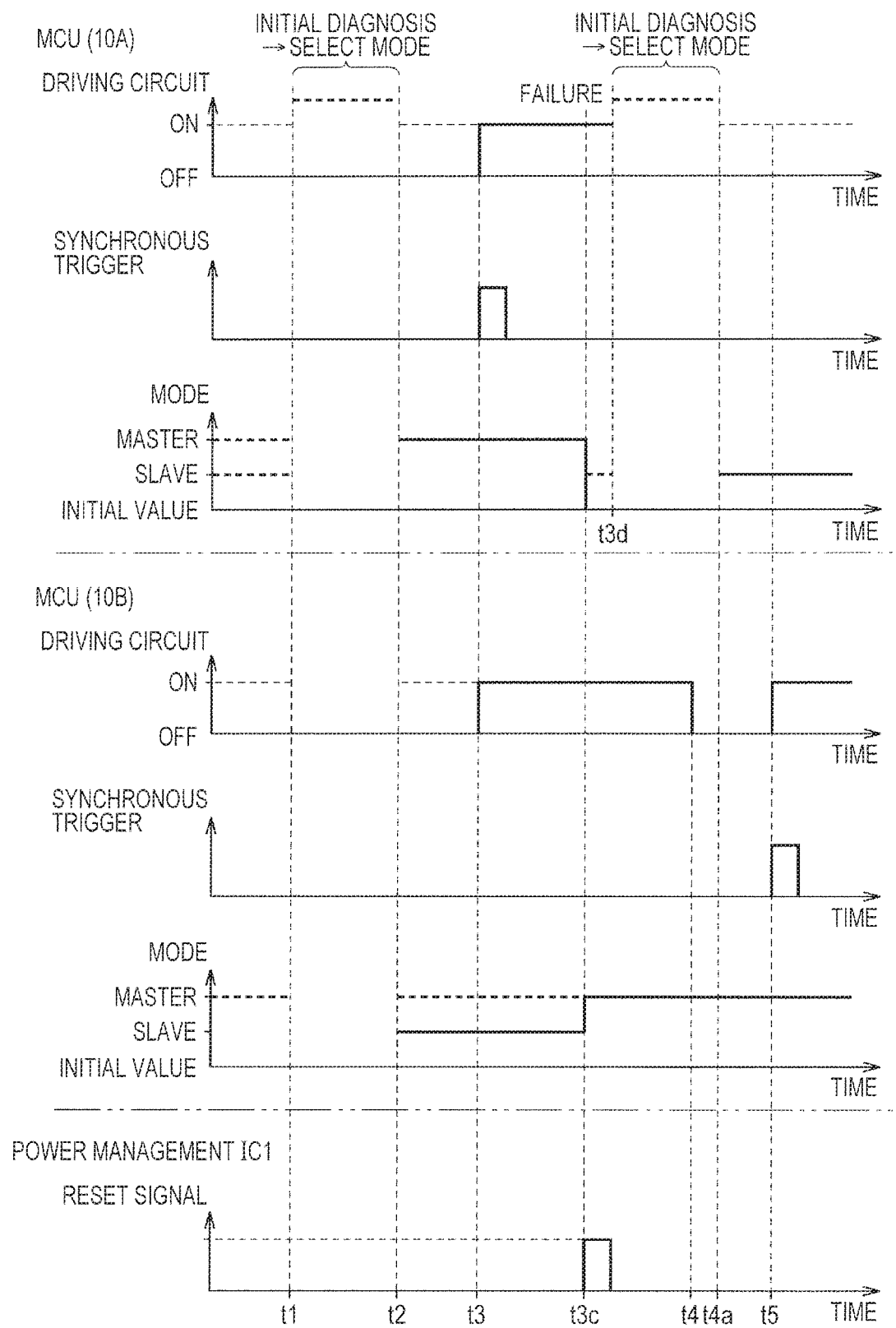
FIG. 17 is a timing chart for explaining control of the motor driving apparatus according to the second embodiment, when an error has occurred in an MCU on the master side during control of the motor.

FIG. 17 is a timing chart for explaining the control of the motor driving apparatus 100A according to the second embodiment, when an error has occurred in the MCU on the master side during the motor control. As illustrated in FIG. 17, during the period of the motor control (the period from the time t4 until the time t4), an error occurs in the operation of the MCU 10A (the first MCU), for example, due to the runaway of the program (time t3c). The power management IC 13A (the power management IC 1) outputs a reset signal RST1. The MCU 10B (the second MCU) performs the master setting, upon reception of the reset signal RST1. As a result, the control mode of the MCU 10B is set in the master mode.

At a time t3d, the MCU 10A executes an initial diagnosis process and a mode selection process. At a time t4a, the control mode of the MCU 10A is set in the slave mode.

At a time t5, the next control cycle starts. The MCU 10B (the second MCU) outputs a synchronous trigger signal, and turns on the driving circuit 11B. The MCU 10A (the first MCU) can receive the synchronous trigger signal. When the MCU 10A can control the driving circuit 11A, the MCU 10A turns on the driving circuit 11A, in response to the synchronous trigger signal. In this case, the synchronous control can be continued.

According to the second embodiment, also when decoupling occurs with the battery in one system, the motor control cannot be continued by the other system. Alternatively, according to the second embodiment, even when an error has occurred, for example, when the MCU of the counterpart system does not function due to the runaway, the operation of the MCU is reset, thereby enabling to continue the motor control. When there is no error in the driving system, it is possible to restart the synchronous control after resetting the MCU.

Third Embodiment

Figure 18:
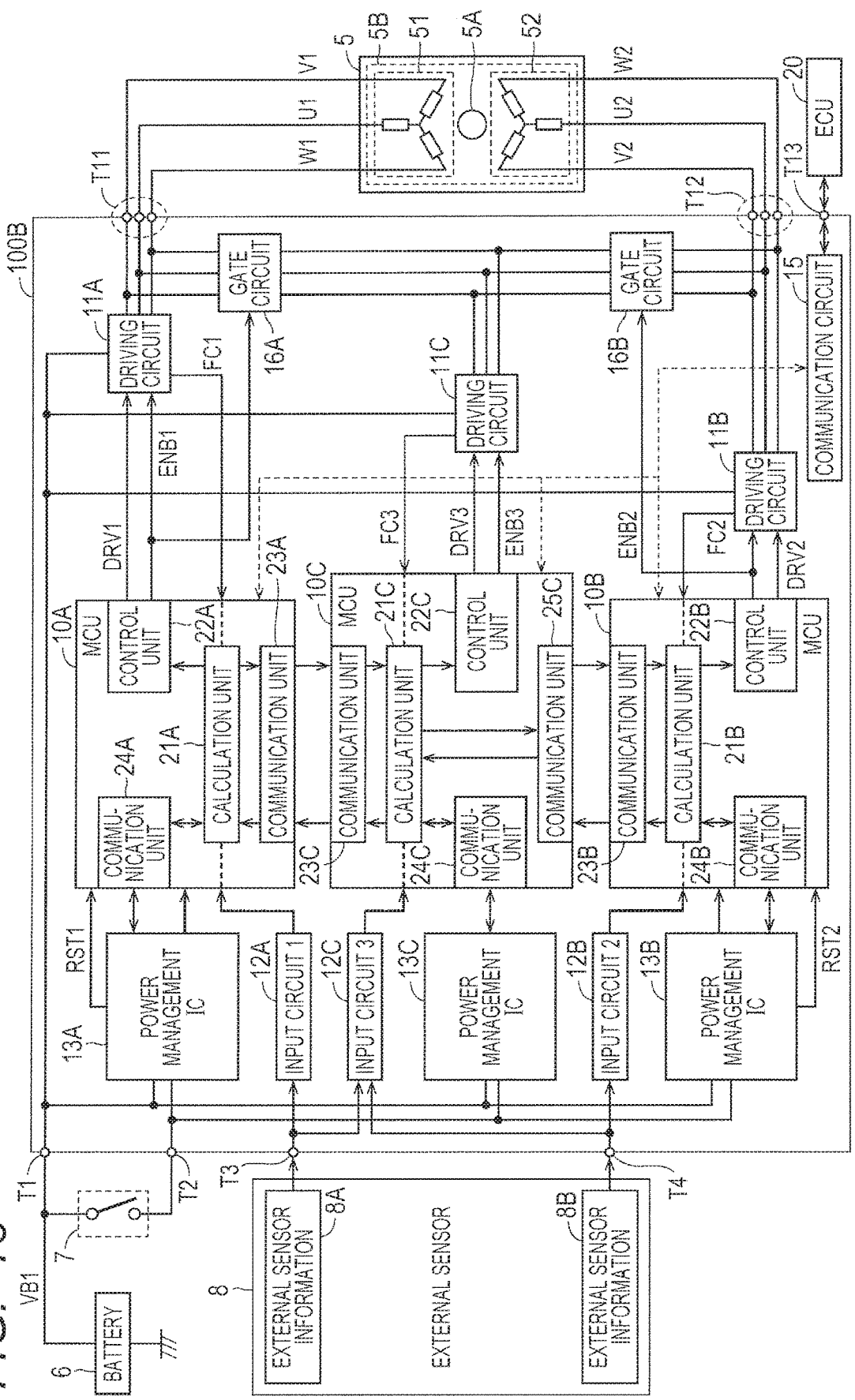
FIG. 18 is a block diagram illustrating an approximate configuration of a motor driving apparatus according to a third embodiment.

FIG. 18 is a block diagram illustrating an approximate configuration of a motor driving apparatus according to a third embodiment. The motor driving apparatus according to the third embodiment includes an MCU 10C, a driving circuit 11C, an input circuit 12C, a power management IC 13C, and gate circuits 16A and 16B, in addition to the configuration illustrated in FIG. 2. By the gate circuits 16A and 16B, when a failure has occurred in the driving circuits 11A and 11B, the driving circuit with the failure can be replaced by the driving circuit 11C, thereby maintaining the duplicate control systems.

The input circuit 12C receives both of the external sensor information 8A and the external sensor information 8B. The information received by the input circuit 12C is transmitted to the MCU 100.

The MCU 100 as the third MCU can execute the same operations as those of the MCUs 10A and 10B. The MCU 100 includes a calculation unit 21C, a control unit 22C, communication units 23C, 24C, and 25C.

The communication unit 23C is an interface circuit for communicating with the MCU 10A. The communication unit 25C is an interface circuit for communicating with the MCU 10B. The control unit 22C transmits a control signal DRV3 to the driving circuit 11C to control the driving circuit 11C. Further, the control unit 22C outputs an enable signal ENB3 for enabling and disabling the operation of the driving circuit 11C, to the driving circuit 11C.

The driving circuit 11C is a three-phase inverter circuit having the same configuration as that of the driving circuits 11A and 11B, and converts DC power supplied from the battery 6 through the terminal T1 into AC power. The driving circuit 11C supplies a feedback current FC3 to the calculation unit 21C.

In response to the enable signal ENB1, the gate circuit 16A switches whether to couple the driving circuit 11C to the first winding group 51 of the motor 5. In response to the enable signal ENB2, the gate circuit 16B switches whether to couple the driving circuit 11C to the second winding group 52 of the motor 5. Specifically, when the enable signal ENB1 is inactivated, the gate circuit 16A couples the first winding group 51 with the driving circuit 11C. When the enable signal ENB1 is activated, the gate circuit 16A separates the driving circuit 110 from the first winding group 51. Similarly, when the enable signal ENB2 is inactivated, the gate circuit 16B couples the second winding group 52 with the driving circuit 11C. when the enable signal ENB2 is activated, the gate circuit 16B separates the driving circuit 11C from the second winding group 52. In this embodiment, if the driving circuits 11A and 11B are both normal, the enable signal ENB1 and the enable signal ENB2 are both activated. When one of the driving circuits 11A and 11B is erroneous, and when the other one thereof is normal, of the enable signals ENB1 and ENB2, the enable signal transmitted to the erroneous driving circuit is inactivated, and the enable signal transmitted to the normal driving circuit is activated.

At the activation of the system (at the execution of the initialization process), the control mode of the MCU 100 is set in the slave mode. The control mode of one of the MUCs 10A and 10B is set in the master mode, while the control mode of the other MCUs 10A and 10B is set in the slave mode. The MCUs 10A and 10B execute the synchronous control. This synchronous control by the MCUs 10A and 10B is the same as that of the first and second embodiments, and thus will not be described over and over.

When an error has occurred in the system on the master side, the MCU 100 switches the control mode to the master mode. In this case, the MCU 100 calculates a control amount based on information from the input circuit 12C, to control the driving circuit 11C in accordance with the control amount. As a result, the synchronous control of the motor 5 can be continued.

When the MCU 10A operates in the master mode, if an error has occurred in the MCU 10A, the MCU 10A may not control the gate circuit 16A. To handle this case, the gate circuit 16A may include a pull-up circuit (or a pull-down circuit) for switching between enabling and disabling of the gate circuit 16A. Similarly, the gate circuit 16B may also include a pull-up circuit (or a pull-down circuit) for switching between enabling and disabling of the gate circuit 16B.

The pull-up circuit (or a pull-down circuit) includes a resistor and a switch (for example, an N-type transistor) which are coupled in series between a high potential node and a low potential node. By using, for example, the pull-up circuit, the gate circuit can be enabled, when the control signal from the control unit of the MCU is low. By using, for example, the pull-down circuit, the gate circuit can be enabled, when the control signal from the control unit of the MCU is high.

Figure 19:
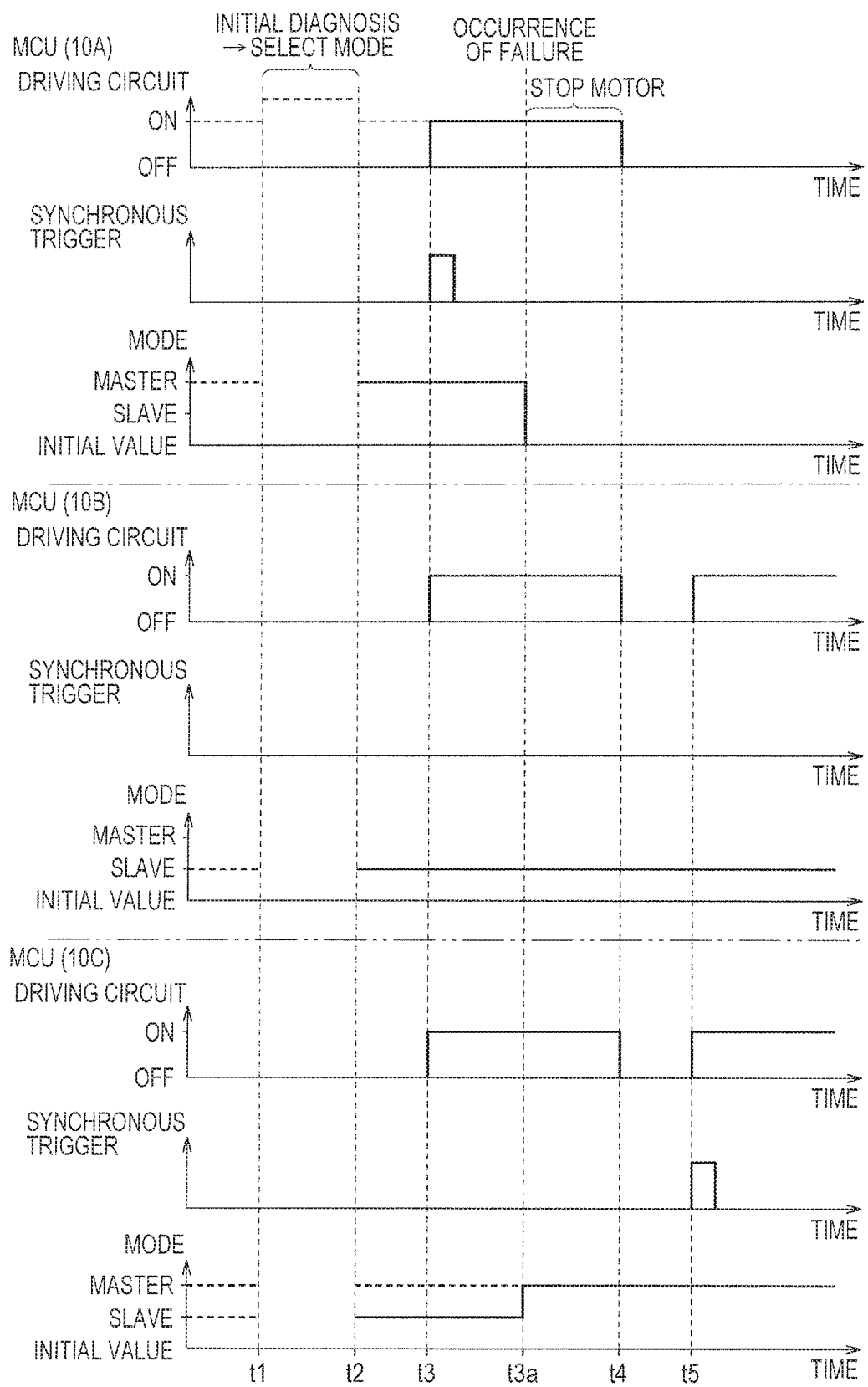
FIG. 19 is a timing chart for explaining control of the motor driving apparatus according to the third embodiment, when an error has occurred in the driving system of the master side.

FIG. 19 is a timing chart for explaining control of the motor driving apparatus 100B according to the third embodiment, when an error has occurred in the driving system on the master side. First, let it be assumed that the control mode of the MCU 10A is set in the master mode, and the control mode of the MCU 10B and MCU 100 is set in the slave mode. The driving circuit 11C on the side of the MCU 100 is turned on by a synchronous trigger signal, at the time t3. However, the gate circuit 16A couples the driving circuit 11A to the first winding group 51 of the motor 5. As a result, no driving current is output from the driving circuit 11C.

At the time t3a, a failure occurs in the driving circuit (the driving circuit 11A) on the master side. In this case, the MCU 10A executes the procedure of Step S52 illustrated in FIG. 8 and procedures of Steps S53, S54, and S57 illustrated in FIG. 9. This results in inhibiting from the motor control. Further, the MCU 10A informs the MCU 100 of the system error, and initializes the value representing the control mode.

The MCU 100 executes procedures of S71, S72, S74, and S75 illustrated in FIG. 11, in response to the notification from the MCU 10A. Then, the control mode of the MCU 100 is switched from the slave mode to the master mode. The driving circuit 11A is turned off at the time t4. The MCU 10A inactivates the enable signal ENB1. As a result, the gate circuit 16A couples the driving circuit 11C to the first winding group 51 of the motor 5.

At the time t5, the MCU 100 turns on the driving circuit 11C, and also outputs a synchronous trigger signal. The MCU 10B turns on the driving circuit 11B, in response to the synchronous trigger signal. The synchronous control by the MCU 100 and the MCU 10B is continued.

Figure 20:
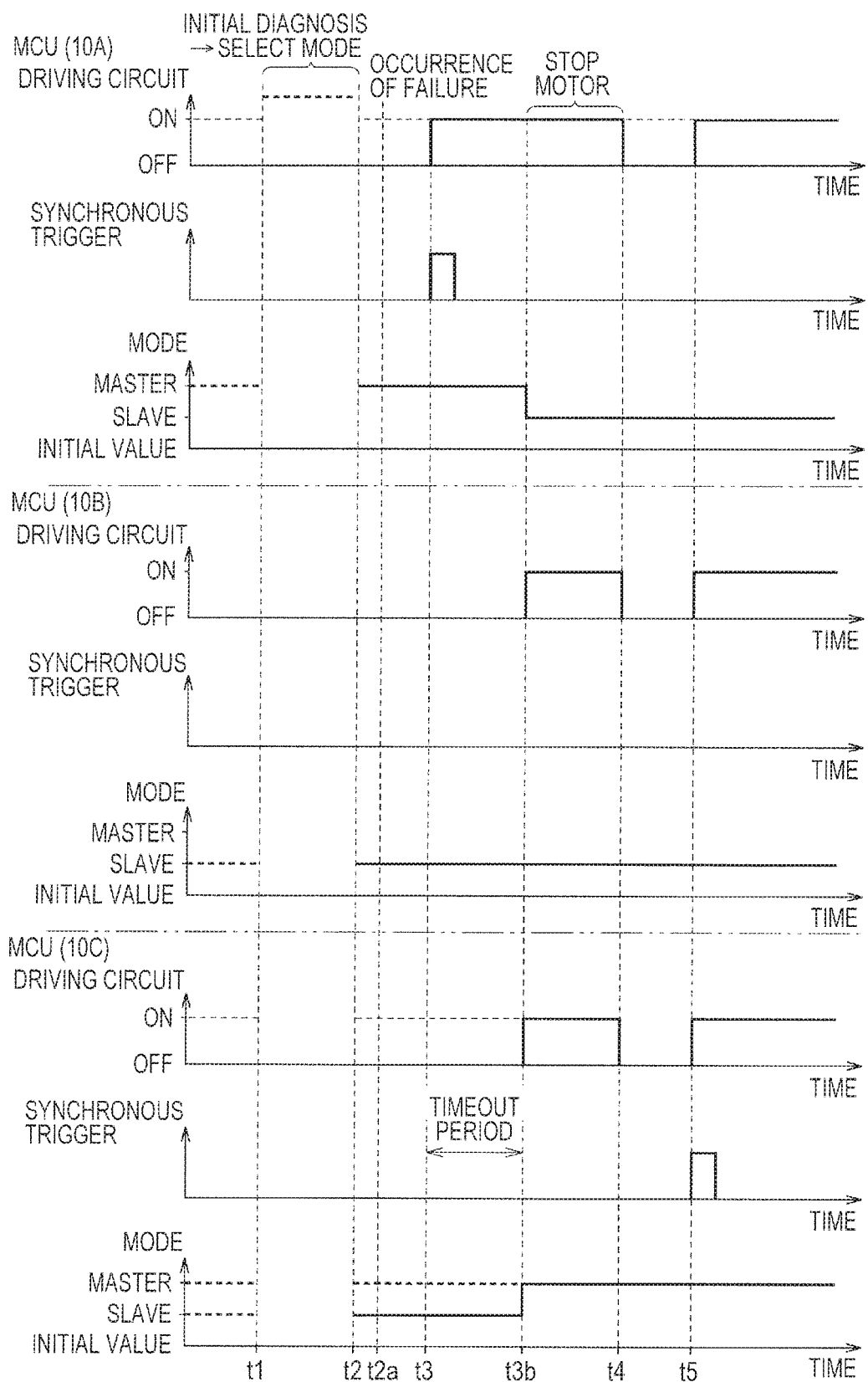
FIG. 20 is a timing chart for explaining control of the motor driving apparatus according to the third embodiment, when an error has occurred in the communication system of the master side.

FIG. 20 is a timing chart for explaining the control of the motor driving apparatus 100B according to the third embodiment, when an error has occurred in the communication system on the master side. As illustrated in FIG. 20, at the time t2a, a failure occurs in the communication system (the MCU 10A) of the master side. The MCU 100 waits for a synchronous trigger signal, during a period set as a timeout period since the time t3 as the start time of the control cycle. However, the timeout occurs at the time t3b. The MCU 100 executes the procedures of Steps S47, S48, S50, and S51 illustrated in FIG. 8, and switches the control mode from the slave mode to the master mode. Further, the MCU 100 informs the MCU 10A of the error of the communication system. The MCU 10A executes the procedures of Steps S71, S72, and S73 illustrated in FIG. 11. As a result, the control mode of the MCU 10A is switched from the master mode to the slave mode.

At the time t3b, the MCU 10B turns on the driving circuit 11B to start the motor control. The MCU 100 turns on the driving circuit 11C. However, the gate circuit 16A couples the driving circuit 11A to the first winding group 51 of the motor 5. Thus, no driving current is supplied from the driving circuit 11C to the first winding group 51.

At the time t4, the driving circuit 11B and the driving circuit 11C are turned off. At the time t5, the MCU 100 turns on the driving circuit 11C, and outputs a synchronous trigger. However, the gate circuit 16A keeps coupling the driving circuit 11A to the first winding group 51 of the motor 5. That is, the MCU 10A continues to control the driving circuit 11A in the slave mode. Because the control of the driving circuit 11A by the MCU 10A is normal, the MCU 10A can be enabled and used.

Because the MCU 10C is set in the master mode, it functions as a trigger circuit providing a synchronous trigger signal. In response to a synchronous trigger from the MCU 10C, the MCUs 10A and 10B control respectively the driving circuits 11A and 11B. This enables to continue the synchronous control.

According to the third embodiment, it is possible to enhance redundancy, as compared with the first and second embodiments.

According to the above embodiments, the six-phase motor has been described by way of example. However, the configuration of the motor is not limited thereto. This embodiment is applicable to the brushless motor including at least three or more phase windings and stators. That is, the number of phases may be three or more. The minimum configuration including this embodiment is applicable to the three-phase motor. When the control of the motor is three-phase control, the number of phase windings of the motor is a multiple of 3. When the control of the motor is four-phase control, the number of phase windings of the motor is a multiple of 4.

It is not limited that the random value for use in the setting of the master and the slave is generated by the power management IC. For example, acquisition and comparison of random values may be performed by the following method.

(1) At the initialization process, the MCU performs A/D conversion, and may compare digital values after conversion.

(2) The MCU accesses an arbitrary address in an initialized memory, and may compare the values stored in the memory cell of the address.

(3) After starting the timer count, the MCU may compare the timer values at the completion of communication.

(4) When the MCUs have different model numbers, they may compare the model numbers. In the master/slave setting process illustrated in FIG. 7, the MCU with a larger random value is set as the master. However, it is possible to set the MCU with a smaller random value as the slave.

The method for determining the master and the slave in accordance with the random value is only one example. Any determination method is applicable to this embodiment, as long as the master and the slave can be uniquely determined. Thus, it is not limited that the determination method for the master and the slave adopts random values.

The motor driving apparatus according to each of the above-described embodiments can be configured in a manner the driver is informed of occurrence of an error in the motor driving apparatus. There is no particular restriction on the notification means and method for the driver. For example, when an error has occurred in the motor driving apparatus, it is possible to notify the driver of the error, by turning on a warning lamp.

Accordingly, the inventions by the present inventors have specifically been described based on the preferred embodiments. However, the present invention is not limited thereto, and various modifications are possible without departing from the scope thereof.

What is claimed is:

1. A motor driving apparatus which drives a motor having a plurality of independent winding groups, the motor driving apparatus comprising:
a first driving control circuit; and
a second driving control circuit,
wherein each of the first driving control circuit and the second driving control circuit is configured to drive a corresponding winding group of the winding groups, and has a master mode and a slave mode as operation modes,
wherein, when the operation mode of the first driving control circuit is set in the master mode and the operation mode of the second driving control circuit is set in the slave mode,
the first driving control circuit in the master mode outputs a synchronous trigger signal in synchronization with driving of the corresponding winding group to the second driving control circuit,
the second driving control circuit in the slave mode receives the synchronous trigger signal from the first driving control circuit, and synchronizes driving of the corresponding winding group with the synchronous trigger signal, and
wherein, when an error has occurred in an operation of the first driving control circuit in the master mode, the second driving control circuit switches the operation mode of the second driving control circuit from the slave mode to the master mode.

2. The motor driving apparatus according to claim 1,
wherein, when the second driving control circuit cannot receive the synchronous trigger signal at a point time to receive the synchronous trigger signal, the second driving control circuit determines whether to receive the synchronous trigger signal until a timeout period elapses, and
wherein, when the timeout period has elapsed, the second driving control circuit determines the error of the first driving control circuit, and switches the operation mode from the slave mode to the master mode.

3. The motor driving apparatus according to claim 2,
wherein the second driving control circuit transmits notification representing the error in transmission of the synchronous trigger signal to the first driving control circuit, and
wherein the first driving control circuit receives the notification, and switches the operation mode from the master mode to the slave mode.

4. The motor driving apparatus according to claim 1,
wherein, when the error of the first driving control circuit is one regarding the corresponding winding group, the first driving control circuit stops driving of the corresponding winding group, and transmits notification representing the error regarding the driving of the corresponding winding group to the second driving control circuit, and
wherein the second driving control circuit receives the notification, and switches the operation mode from the slave mode to the master mode.

5. The motor driving apparatus according to claim 1,
wherein the first driving control circuit includes:
a first driving circuit which drives a first winding group as the corresponding winding group, a first control circuit which controls the first driving circuit, and a first power supply control circuit which is coupled to a first power source and supplies a power source voltage to the first control circuit, wherein the second driving control circuit includes:

a second driving circuit which drives a second winding group as the corresponding winding group, a second control circuit which controls the second driving circuit, and a second power supply control circuit which is coupled to a second power source and supplies a power source voltage to the second control circuit, wherein, when an operation a corresponding control circuit is erroneous, each of the first power supply control circuit and the second power supply control circuit transmits a reset signal to the first control circuit and the second control circuit to reset the operation of the corresponding control circuit, and wherein the second control circuit receives the reset signal for resetting the operation of the first control circuit, thereby switching the operation mode of the second driving control circuit from the slave mode to the master mode.

6. The motor driving apparatus according to claim 5, wherein the first control circuit receives the reset signal, thereby switching the operation mode of the first driving control circuit from the master mode to the slave mode, and controls the first driving circuit in synchronization with the synchronous trigger signal, when the first driving circuit can normally be controlled.

7. The motor driving apparatus according to claim 6, wherein, after the operation mode of the first driving control circuit and the second driving control circuit is set, the first driving control circuit and the second driving control circuit switch the operation mode from the slave mode to the master mode in accordance with the reset signal.

8. The motor driving apparatus according to claim 1, wherein the first driving control circuit is coupled to the corresponding winding group, wherein the motor driving apparatus further comprises a gate circuit which switches between coupling between the second driving control circuit and the corresponding winding group and decoupling between the second driving control circuit and the corresponding winding group, wherein, when the operation mode of the first driving control circuit is the master mode, the gate circuit separates the second driving control circuit from the corresponding winding group, wherein, when the error of the first driving control circuit is an error regarding driving of the corresponding winding group, the first driving control circuit stops driving of the corresponding winding group, and transmits notification representing the error regarding the driving of the corresponding winding group to the second driving control circuit, the gate circuit couples the second driving control circuit to the corresponding winding group, and the second driving control circuit receives the notification, and switches the operation mode from the slave mode to the master mode.

9. The motor driving apparatus according to claim 8, wherein, when the second driving control circuit cannot receive the synchronous trigger signal at a point to receive the synchronous trigger signal, the second driving control circuit determines whether the synchronous trigger signal can be received until a timeout period elapses, wherein, when the timeout period has elapsed, the second driving control circuit determines the error of the first driving control circuit, switches the operation mode from the slave mode to the master mode, and transmits notification representing the error regarding transmission of the synchronous trigger signal to the first driving control circuit, and the first driving control circuit receives the notification, and switches the operation mode from the master mode to the slave mode.

10. The motor driving apparatus according to claim 1, wherein each of the first driving control circuit and the second driving control circuit generates a random value at initial setting, compares the random values, and exclusively determines the operation mode thereof between the master mode and the slave mode.

11. The motor driving apparatus according to claim 1, wherein, when the operation mode of the second driving control circuit is the slave mode, if an error has occurred in driving of the corresponding winding group by the second driving control circuit, the second driving control circuit stops driving of the corresponding winding group.

12. The motor driving apparatus according to claim 1, wherein, when the first driving control circuit returns from the error, the first driving control circuit sets the operation mode of the first driving control circuit to the slave mode.

13. The motor driving apparatus according to claim 1, wherein the first driving control circuit and the second driving control circuit execute a communication check process for mutually transmitting data independently from control of the motor, and switch the operation mode of the second driving control circuit from the slave mode to the master mode, when an error has occurred in transmission of the data from the first driving control circuit to the second driving control circuit.

14. A motor driving method for driving a motor having a plurality of independent winding groups, by a first driving control circuit and a second driving control circuit, the method comprising:

setting an operation mode of the first driving control circuit to a master mode;

setting an operation mode of the second driving control circuit to a slave mode;

driving a corresponding winding group of the winding groups by the first driving control circuit, and outputting a synchronous trigger signal in synchronization with the driving of the corresponding winding group;

driving a corresponding winding group of the winding groups in synchronization with the synchronous trigger signal, by the second driving control circuit; and switching the operation mode of the second driving control circuit from the slave mode to the master mode, when an error has occurred in an operation of the first driving control circuit in the master mode, wherein the switching includes:

determining, by the second driving control circuit, whether to receive the synchronous trigger signal until a timeout period elapses, when the second driving control circuit cannot receive the synchronous trigger signal at a point to receive the synchronous trigger signal, and determining, by the second driving control circuit, whether the error has occurred in the first driving control circuit, when the timeout period has elapsed.

15. The motor driving method according to claim 14, wherein the switching further includes:

transmitting, by the second driving control circuit, notification representing the error regarding transmission of the synchronous trigger signal to the first driving control circuit, and receiving the notification by the first driving control circuit, thereby switching the operation mode from the master mode to the slave mode.

16. A motor driving method for driving a motor having a plurality of independent winding groups, by a first driving control circuit and a second driving control circuit, the method comprising:

setting an operation mode of the first driving control circuit to a master mode;

setting an operation mode of the second driving control circuit to a slave mode;

driving a corresponding winding group of the winding groups by the first driving control circuit, and outputting a synchronous trigger signal in synchronization with the driving of the corresponding winding group;

driving a corresponding winding group of the winding groups in synchronization with the synchronous trigger signal, by the second driving control circuit; and switching the operation mode of the second driving control circuit from the slave mode to the master mode, when an error has occurred in an operation of the first driving control circuit in the master mode, wherein the switching includes:

detecting occurrence of an error in the corresponding winding group by the first driving control circuit, and transmitting, by the first driving control circuit, notification representing the error regarding the driving of the corresponding winding group to the second driving control circuit.

* * * * *